US012708940B2

(12) United States Patent
Nelson et al.

(10) Patent No.: US 12,708,940 B2
(45) Date of Patent: Aug. 18, 2026

(54) RESIDUAL STRESS MANAGEMENT THROUGH CLOSED LOOP CONTROL

(71) Applicants: Rolls-Royce Corporation, Indianapolis, IN (US); Rolls-Royce plc, London (GB)

(72) Inventors: Scott Nelson, Indianapolis, IN (US); David James Puhl, Indianapolis, IN (US); Clive Grafton-Reed, London (GB); Peter E. Daum, Indianapolis, IN (US); Robert F. Proctor, Indianapolis, IN (US); Christopher Paul Heason, London (GB)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 78 days.

(21) Appl. No.: 18/593,344

(22) Filed: Mar. 1, 2024

(65) Prior Publication Data

US 2025/0276369 A1 Sep. 4, 2025

(51) Int. Cl.

| | |
|---|---|
| ***B22F 10/36*** | (2021.01) |
| ***B22F 10/28*** | (2021.01) |
| ***B22F 10/37*** | (2021.01) |
| ***B22F 12/90*** | (2021.01) |
| ***B33Y 30/00*** | (2015.01) |
| ***B33Y 50/02*** | (2015.01) |

(52) U.S. Cl.

CPC .............. *B22F 10/36* (2021.01); *B22F 10/37* (2021.01); *B22F 12/90* (2021.01); *B33Y 30/00* (2014.12); *B33Y 50/02* (2014.12); *B22F 10/28* (2021.01); *B22F 2203/11* (2013.01)

(58) Field of Classification Search

USPC .................................................. 700/118–120

See application file for complete search history.

(56) References Cited

U.S. PATENT DOCUMENTS

| | | | |
|---|---|---|---|
| 6,922,599 | B2 | 7/2005 | Richey |
| 7,725,206 | B2 | 5/2010 | Richey |
| 10,456,984 | B2 | 10/2019 | Matusik et al. |
| 10,889,067 | B1 | 1/2021 | Eller et al. |

(Continued)

FOREIGN PATENT DOCUMENTS

| | | | |
|---|---|---|---|
| AU | 2020244584 | B2 | 12/2022 |
| CN | 106475558 | B | 12/2019 |

*Primary Examiner* — Sean Shechtman

(74) *Attorney, Agent, or Firm* — Shumaker & Sieffert, P.A.

(57) ABSTRACT

An additive manufacturing system includes an energy delivery device configured to deliver, a powder delivery device, and one or more thermal sensors configured to measure a temperature of a first portion of the additively-manufactured component and a second portion of the additively manufactured component. The additive manufacturing system includes a computing device configured to receive data indicative of the temperature of the first portion and of the second portion, determine a residual stress of the additively-manufactured component based at least partially on the received thermal sensor data from the first portion of the additively-manufactured component and the received data from the second portion of the additively-manufactured component; and predict final dimensions of the additively-manufactured component based at least partially on the determined residual stress of the additively-manufactured component.

19 Claims, 8 Drawing Sheets

(56) References Cited

U.S. PATENT DOCUMENTS

| | | | |
|---|---|---|---|
| 11,079,745 | B2 | 8/2021 | Giera |
| 11,150,633 | B2 | 10/2021 | de Souza Borges Ferreira et al. |
| 11,465,240 | B2 | 10/2022 | Liu |
| 11,663,373 | B1 * | 5/2023 | Chalavadi ............ B23K 26/342 703/1 |
| 2017/0059529 | A1 | 3/2017 | Kamel et al. |
| 2018/0099333 | A1 | 4/2018 | DehghanNiri et al. |
| 2018/0297115 | A1 | 10/2018 | Diwinsky et al. |
| 2023/0089809 | A1 | 3/2023 | Nelson et al. |
| 2023/0090298 | A1 | 3/2023 | Nelson et al. |
| 2023/0091046 | A1 | 3/2023 | Nelson et al. |
| 2023/0092671 | A1 | 3/2023 | Nelson et al. |
| 2025/0284270 | A1 * | 9/2025 | Yavari .................... B33Y 10/00 |

* cited by examiner

222
P1
P2
P3
229
224A
224B
224C
225
H1
H2
H3
H0
L1
L2
L3
L0
Z
Y
X

222
P1
P2
P3
229
224A
224B
224C
225
231
H1
H2
H3
H0
L1
L2
L3
L0
Z
Y
X

322
L1
L2
L3
L0
325
P1
P2
P3
329
324A
324B
324C
H1
H2
H3
H0
320
Z
Y
X

RESIDUAL STRESS MANAGEMENT THROUGH CLOSED LOOP CONTROL

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing component to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures.

SUMMARY

Additive manufacturing systems and techniques, such as directed energy deposition (DED) processes, operate according to a multifactor balance of mass flux and heat flux to deposit material layer-by-layer to form an additively-manufactured component (hereinafter, "component"). The material composition, geometry, and thermal history of the component may result in residual stress in the component. Residual stresses, such as those caused by different portions of the component thermally expanding and/or contracting at different rates, may cause deformation of the component such that one or more component dimensions change between an initial as-deposited state and a final state. Additive manufacturing systems and techniques according to the present disclosure may determine residual stress in the component in-situ (e.g., during the additive manufacturing process), and may use the determined residual stress to predict final component dimensions. In some examples, the predicted final component dimensions may be compared to planned final component dimensions (e.g. design dimensions), to validate that the component is being built correctly, or to stop the additive manufacturing process if the predicted final dimensions based on the residual stresses of the component do not meet a threshold for matching the planned final component dimensions. Further, systems and techniques according to this disclosure may modify a build strategy of the component during manufacturing to counteract or leverage the residual stresses in the component to result in a component where the actual final dimensions, after exertion of residual stress in the component, match the planned final dimensions.

An additive example manufacturing system includes an energy delivery device configured to deliver energy to a build surface of an additively-manufactured component to form a melt pool in the build surface of the component, a powder delivery device configured to direct a powder stream toward the melt pool, one or more thermal sensors configured to measure a temperature of a first portion of the additively-manufactured component and a second portion of the additively manufactured component, and a computing device. The computing device is configured to receive data indicative of the temperature of the first portion of the additively-manufactured component from the one or more thermal sensors captured at a first point in time and at a second point in time, receive data indicative of a temperature of the second portion of the plurality of portions of the additively-manufactured component from the one or more thermal sensors at a second point in time, determine a residual stress of the additively-manufactured component based at least partially on the received thermal sensor data from the first portion of the additively-manufactured component and the received data from the second portion of the additively-manufactured component, and predict final dimensions of the additively-manufactured component based at least partially on the determined residual stress of the additively-manufactured component.

An example method includes receiving, by a computing device, data indicative of the temperature of a first portion of an additively-manufactured component from one or more thermal sensors of an additive manufacturing system captured at a first point in time and at a second point in time. The method further includes receiving, by the computing device, data indicative of a temperature of a second portion of the plurality of portions of the additively-manufactured component from the one or more thermal sensors at a second point in time. The method further includes determining, by the computing device, a residual stress of the additively-manufactured component based at least partially on the received thermal sensor data from the first portion of the additively-manufactured component and the received data from the second portion of the additively-manufactured component. The method also includes predicting final dimensions of the additively-manufactured component based at least partially on the determined residual stress of the additively-manufactured component.

The details of one or more examples are set forth in the accompanying drawings and the description below. Other features, objects, and advantages will be apparent from the description and drawings, and from the claims.

DETAILED DESCRIPTION

Figure 1:
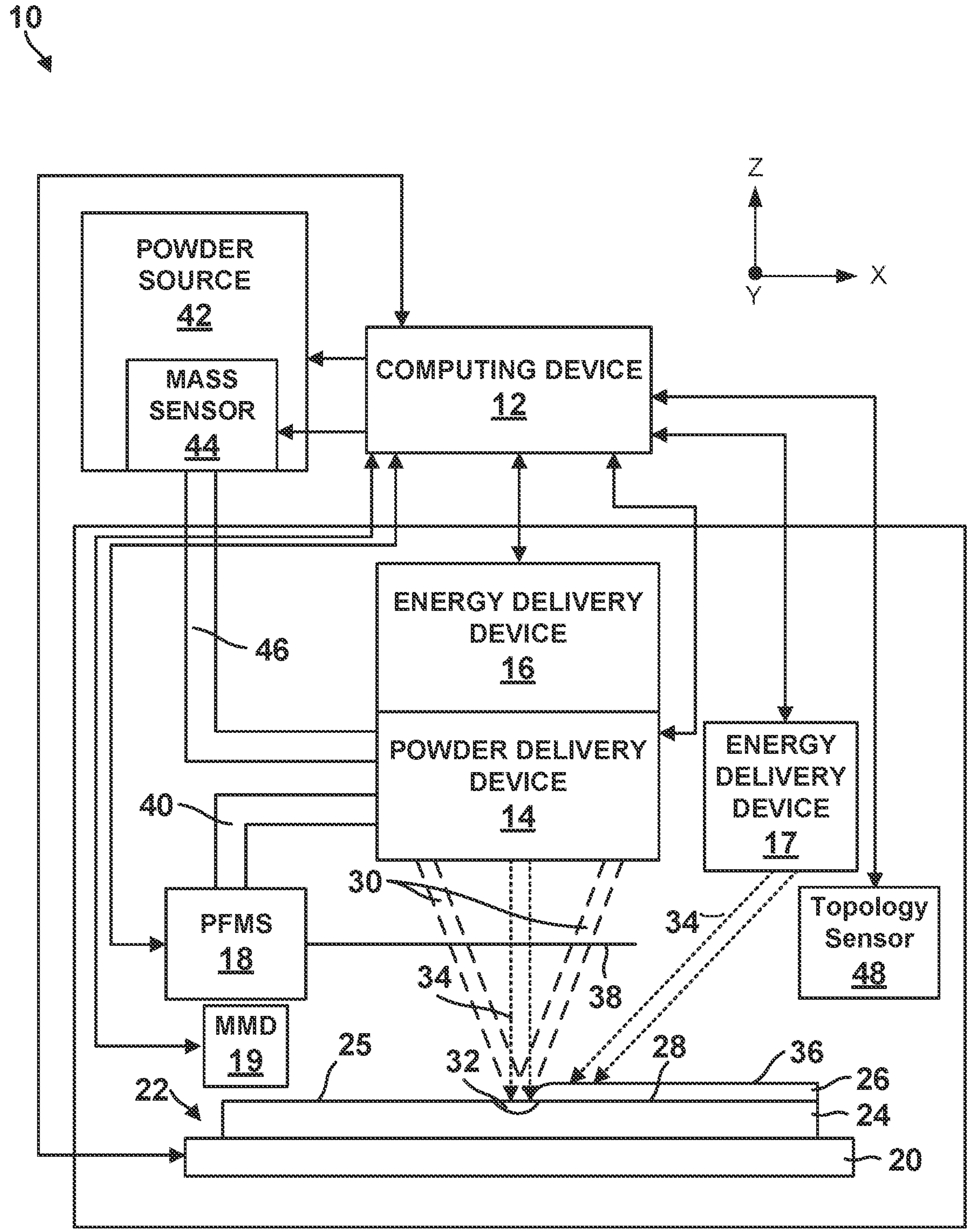
FIG. 1 is a conceptual block diagram illustrating aspects of an example additive manufacturing system that includes a powder delivery device configured to direct a powder stream toward a melt pool a first energy delivery device, a second energy delivery device, and a computing device configured to control the additive manufacturing system during an additive manufacturing technique to determine, predict, and control residual stresses within the component.

The disclosure generally describes techniques and systems for managing residual stresses during an additive manufacturing technique, such as a directed energy deposition (DED) technique. During DED additive manufacturing, a component is built up by adding material to the component in sequential layers. The final component is composed of a plurality of layers of material. In some blown powder additive manufacturing techniques for forming components from metals, ceramics, and/or alloys, an energy source may direct energy at a substrate to form a melt pool. A powder delivery device may deliver a powder to the melt pool, where at least some of the powder at least partially melts and is joined to the melt pool and, thus, the substrate.

The properties of the final component, including the presence or absence of material defects, the resulting microstructure, and residual stresses within the component are a function of a number of variables related to mass flux and heat flux. As such, measurement, modeling, control, and validation of mass flux and heat flux within a blown powder additive manufacturing system (e.g., a DED system) may enable characterization or prediction of final component properties, control of the additive manufacturing technique during the process, quality assurance for the final component, development of new additive manufacturing techniques, and the like.

Challenges may arise while performing additive manufacturing techniques with additive manufacturing systems. For example, additively-manufactured components, especially those which include larger and/or thicker welds or a large number of deposited layers (e.g., hundreds of layers, or thousands of layers) may be subject to distortion/deformation caused by a residual stress or stresses within the component. The residual stress may strain the additively-manufactures component such that one or more dimensions of a layer or the component change between an initial as-deposited state to a final state where the component is cooled and ready for use. Residual stresses may be imparted to the component according to, among other factors, the thermal history of the component and the coefficient of thermal expansion of the materials.

For example, a cooling rate of the component may differ between a first portion of the component (e.g., located at an edge of the component) and a second portion of the component (e.g., located in the middle of the component) because thermal energy may diffuse more quickly from certain portions of the component to the environment. Thus, the first portion of the component and the second portion of the component may thermally expand and contract differently, leaving residual stresses in the component after manufacturing. Similarly, differences in material composition between portions of the additively manufactured component, or differences in topology between portions of the component, or the like may cause residual stresses to be present in the component. Residual stress, as used herein, may refer to any force acting on all or a portion of the component at any time immediately after formation of a portion of the component or the entire component by the additive manufacturing system.

Residual stresses may have deleterious impacts, including causing cracks or other weakness in the component or changing the desired geometry of the final component. For example, due to the residual stresses (e.g., forces of thermal contraction or thermal expansion) being exerted within the component, the component may deform by warping or bowing. Where the component geometry is critical (e.g., aerospace components such as gas turbine engine components including blades, tracks, shrouds, or the like), it may be important to understand and/or mitigate or eliminate residual stresses in the component to minimize distortion between the as-deposited dimensions of the component and the final dimensions after the component has cooled.

In accordance with one or more aspects of the current disclosure, additive manufacturing systems may address these and other problems. Additive manufacturing systems according to the present disclosure may include one or more thermal sensors configured to measure a temperature of a first portion of the component and a second portion of the additively manufactured component. The thermal sensor or sensors may include a thermal imaging camera or cameras and/or one or more temperature probes. The additive manufacturing system may include a computing device that receives data indicative of the temperature of a first portion of the component from the one or more thermal sensors captured at a first point in time and data indicative of the temperature of the first portion captured at a second point in time. The computing device may receive data indicative of a temperature of a second portion of the plurality of portions of the component from the one or more thermal sensors at a second point in time. The computing device may determine a residual stress of the component based at least partially on the received thermal sensor data from the first portion of the component and the received data from the second portion of the component.

In some examples, the computing device may predict the final dimensions of the additive manufacturing system based at least partially on residual stresses in the component in-situ, during manufacturing or after manufacturing without removing the component from a stage used to mechanically support the component during manufacturing. The determined residual stresses may be used to predict final component dimensions after the component has cooled and the distortion and deformation of the component has occurred according to the differing thermal contraction of different portions of the component. In some examples, if the predicted final dimensions of the component meet a threshold for matching the planned final component dimensions, the build may proceed according to plan. However, if the computing device determines that the residual stresses within the component will cause the component to deform such that the predicted final dimensions do not meet the threshold for matching the planned component dimensions, the computing device may output an alarm or may stop the build. As such, the disclosed systems may validate an additive manufacturing process while accounting for residual stresses in the component. Advantageously, the disclosed systems and techniques may result in reduced energy, material waste, and labor on components which will deform because of residual stresses and require rework or discarding.

In some examples, after determining that the predicted final dimensions of the component do not meet the threshold for matching the planned final dimensions, the computing device may control the additive manufacturing system based at least partially on the determined residual stresses to bring the component back into accordance with the specifications. For example, the additive manufacturing system may include a powder delivery device, a first energy delivery device, and a second energy delivery device. The computing device may control at least one of the powder delivery device, the first energy delivery device, or the second energy delivery device based at least partially on the predicted final dimensions of the component to adjust a build strategy of the component based on the determined residual stress. As discussed below, the build strategy may result in the final dimensions of the component. To control the first energy delivery device or the second energy delivery device, the computing device may modify at least one of a power, a travel speed, a spot size, or a power density of the first energy deliver device or the second energy delivery device. Additionally, or alternatively, the computing device may modify the first energy delivery device or the second energy delivery device by causing a pause time or dwell time, or may even cause a cooling device to remove thermal energy from one or more portions of the additively manufactured component. To control the powder delivery device, the computing device may modify the mass flow rate of the powder to adjust the as-deposited thickness of a layer being added to the component. In this way, the disclosed systems may prevent or manage residual stress in the component.

In some examples, residual stresses imparted in the component during manufacture may be desirable. For examples, a large ring weld, or a shrink-fit application, may benefit from deformation after manufacturing. In some examples, a mechanical bond between the component and other components may be improved by deformation after manufacturing due to residual stresses, similar to tightening opposite bolts in an assembly. The disclosed additive manufacturing systems, which may use deposit topology and the thermal history of the component collected by coaxial and off-axis sensors to build a high-fidelity predictive model of the development of the residual stresses of the component, may leverage the residual stresses in the component. For example, because understanding the residual stresses in the component may allow for understating the difference between the as-deposited dimensions of the component and the final dimensions of the component, the disclosed systems may allow for control of the system to deposit the as-deposited initial dimensions of the component differently than the planned dimensions of the component, such that the final dimensions of the component (e.g., after cooling and/or action of the residual stresses) are the planned dimensions of the component.

Figure 5:
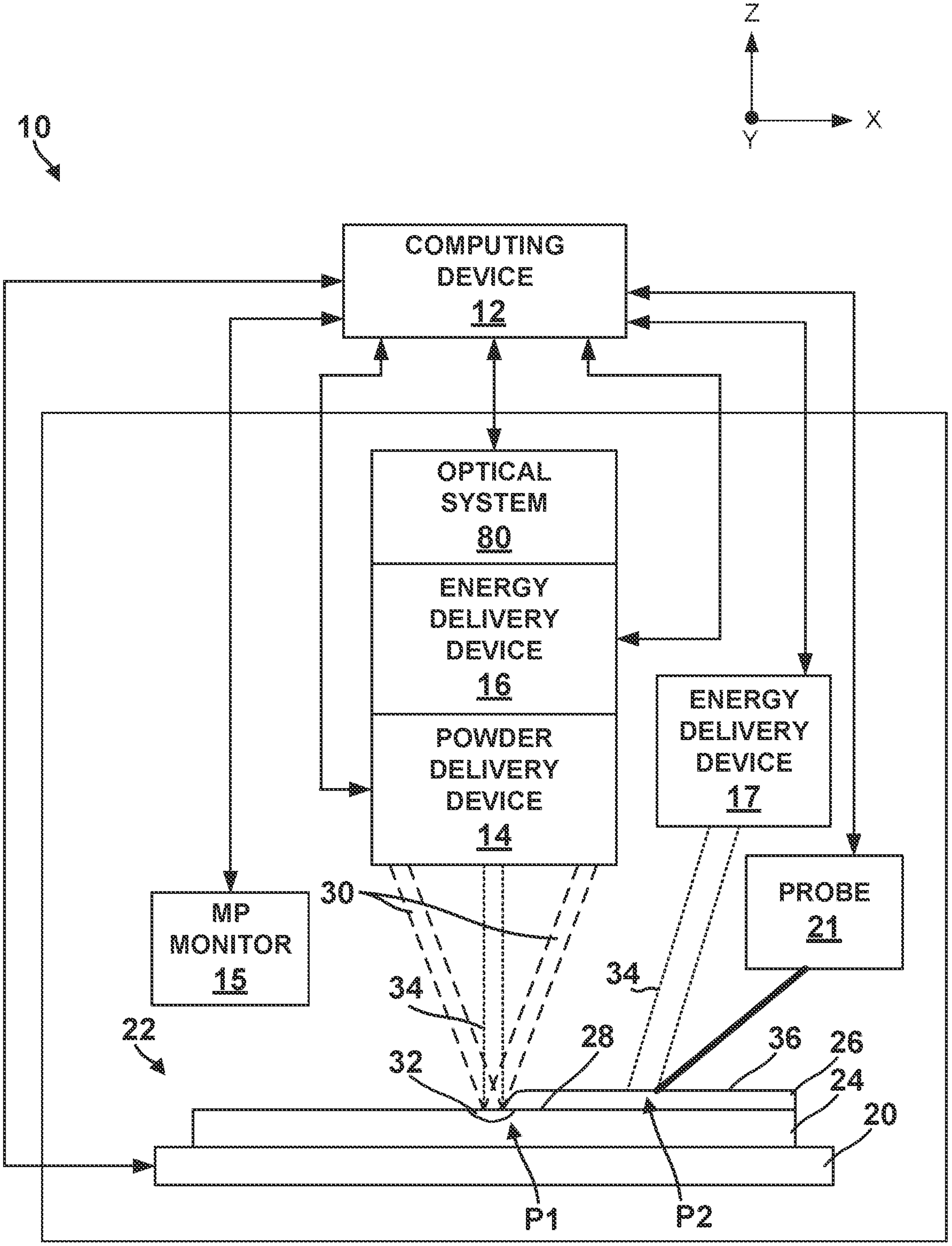
FIG. 5 is a conceptual block diagram illustrating portions of the example additive manufacturing system of FIG. 1, including an optical system for observing thermal emissions around a melt pool and a thermal camera for monitoring a size of the melt pool.

FIG. 1 is a conceptual block diagram illustrating aspects of an example additive manufacturing system 10. Additive manufacturing system 10 includes several components configured to monitor mass flow, and several components configured to monitor energy (e.g., heat flux) within system 10. System 10 includes a powder source mass sensor 44, a powder flow monitoring system (PFMS) 18, and a topology sensor 48. These components are configured to monitor mass flow of powder within additive manufacturing system 10 during an additive manufacturing technique. In the example illustrated in FIG. 1, additive manufacturing system 10 further includes a computing device 12, a powder delivery device 14, a first or primary energy delivery device 16, a second or secondary energy delivery device 17, a stage 20, a powder source 42, powder source mass sensor 44, topology sensor 48, and microstructural monitoring device (MMD) 19. Computing device 12 is operably connected to powder delivery device 14, energy delivery devices 16 and 17, PFMS 18, stage 20, powder source 42, powder source mass sensor 44, topology sensor 48, and MMD 19. FIG. 1 thus illustrates mass flow monitoring and other aspects of example additive manufacturing system 10. To simplify illustration of FIG. 1 and improve clarity of the figure, further aspects of additive manufacturing system 10 are shown in FIG. 5 and described below with reference to FIG. 5, which is more directed toward heat flow aspects of system 10.

Stage 20 is configured to mechanically support a component 22 during an additive manufacturing technique. Component 22 may be considered in-situ when mechanically supported by stage 20. In some examples, stage 20 is movable relative to energy delivery device 16 and/or energy delivery device 16 is movable relative to stage 20. Similarly, stage 20 may be movable relative to powder delivery device 14 and/or powder delivery device 14 may be movable relative to stage 20. For example, stage 20 may be translatable and/or rotatable along at least one axis to position component 22 relative to energy delivery device 16 and/or powder delivery device 14. Similarly, energy delivery device 16 and/or powder delivery device 14 may be translatable and/or rotatable along at least one axis to position energy delivery device 16 and/or powder delivery device 14, respectively, relative to component 22. Stage 20 may be configured to selectively position and restrain component 22 in place relative to stage 20 during manufacturing of component 22.

Powder source 42 is the source of powder for powder stream 30. Powder source 42 may include any suitable container or enclosure, such as a hopper, configured to hold powder. Powder source 42 also may include mechanism for entraining the powder in a gas flow. For instance, powder source 42 may be coupled to a gas source, which provides a gas flowing through powder source 42 and entraining powder within the gas flow. Additionally, or alternatively, powder source 42 may include an agitator configured to agitate the powder and increase entrainment of the powder in the gas stream.

System 10 may include a powder source mass sensor 44 associated with powder source 42. Powder source mass sensor 44 may be configured to quantify loss of mass in the powder source 42 or, alternatively, a mass flow out of powder source 42.

Powder source 42 is fluidically coupled to powder delivery device 14 via a flow path 46. Flow path 46 may include any suitable structure(s) defining an enclosed flow between powder source 42 and powder delivery device, including conduit, pipe, tubes, or the like. Although not shown in FIG. 1, for at least part of flow path 46 between powder source 42 and nozzles of powder delivery device 14, flow path 46 may split into multiple, parallel sections, e.g., one for each nozzle. Further, although not shown in FIG. 1, in some examples, flow path 46 may include one or more nozzles for controlling flow through flow path 46 as a whole or portions of flow path 46 (e.g., a section associated with a particular nozzle of powder delivery device 14).

Powder delivery device 14 may be configured to deliver powder to selected locations of component 22 being formed via a powder stream 30. Powder delivery device 14 may include one or more nozzles that each output powder. The combined powder defines powder stream 30. In some examples, powder delivery device 14 includes a single nozzle, which may be point nozzle, or a single nozzle that is an annular channel. In other examples, powder delivery device 14 includes a plurality of nozzles (e.g., three nozzles or four nozzles). Regardless of the number of nozzles, powder delivery device 14 may output a powder stream that is focused at a focus plane. As powder delivery device 14 is movable in the z-axis shown in FIG. 1 relative to component 22, the focal plane of powder delivery device 14 also may be movable in the z-axis relative to component 22, such that the focus plane may be controlled to be substantially coincident with build surface 28.

At least some of the powder in powder stream 30 may impact a melt pool 32 in component 22. At least some of the powder that impacts melt pool 32 may be joined to component 22. In some examples, powder delivery device 14 may be mechanically coupled or attached to primary energy delivery device 16 to facilitate delivery of powder stream 30 and energy 34 for forming melt pool 32 to substantially the same location adjacent to component 22.

Primary energy delivery device 16 may include an energy source, such as a laser source, an electron beam source, plasma source, or another source of energy that may be absorbed by component 22 to form a melt pool 32 and/or be absorbed by powder in powder stream 30 to be added to component 22. Example laser sources include a CO laser, a $CO_2$ laser, a Nd:YAG laser, or the like. In some examples, the energy source may be selected to provide energy with a predetermined wavelength or wavelength spectrum that may be absorbed by component 22 and/or the powder to be added to component 22 during the additive manufacturing technique.

In some examples, primary energy delivery device 16 also includes an energy delivery head, which is operatively connected to the energy source. The energy delivery head may aim, focus, or direct energy 34 toward predetermined positions at or adjacent to a surface of component 22 during the additive manufacturing technique. As described above, in some examples, the energy delivery head may be movable in at least one dimension (e.g., translatable and/or rotatable) under control of computing device 12 to direct the energy toward a selected location at or adjacent to a surface of component 22. Primary energy delivery device may be configured to focus energy 34 from the energy source on a local spot on build surface 28 to generate melt pool 32.

In some examples, at least a portion of primary energy delivery device 16 and powder delivery device 14 may be combined or attached to each other. For example, a deposition head (e.g., deposition head 54 of FIG. 2) may include part of powder delivery device 14 (e.g., internal channels and powder nozzle(s) 56 for forming powder stream 30 and directing powder stream 30 toward build surface 28) and part of primary energy delivery device 16 (e.g., the energy delivery head). As shown in FIG. 1, in some examples, primary energy delivery device 16 may be arranged of configured such that energy 34 and powder stream 30 both exit from a common deposition head (54, FIG. 2) and are directed toward build surface 28. For instance, energy 34 may pass through a central channel (e.g., formed along central longitudinal axis L, FIG. 2) within the deposition head and exit a central aperture in the deposition head, while fluidized powder may flow through internal channels and powder nozzle(s) 56 for forming powder stream 30 and directing powder stream 30 toward build surface 28. Such an arrangement between primary energy source 16 and powder delivery device 14 may be called an "on-axis" arrangement of primary energy source 16, because both energy and powder may be delivered coaxially with a central longitudinal (Z-direction) axis of the deposition head.

System 10 also includes powder flow monitoring system (PFMS) 18. PFMS 18 is configured to image at least a portion of powder stream 30 to detect powder flowing between powder delivery device 14 and build surface 28. For example, PFMS 18 may include an illumination device and an imaging device. In some examples, the illumination device may include one or more light source. For instance, the illumination device may include one or more structured light devices, such as one or more lasers. The illumination device is configured to illuminate a plane of powder stream 30 at image plane 38, e.g., a plane substantially perpendicular to an axis extending between powder delivery device 14 and build surface 28 (e.g., central longitudinal axis L).

The imaging device of PFMS 18 is configured to image at least some of the illuminated powder. The imaging device may have a relatively high data acquisition speed (e.g., frame rate), such greater than 1000 Hz. Because of the velocity of the powder in powder stream 30, even such a frame rate may image only a fraction of the powder flowing between powder delivery device 14 and build surface 28.

In some examples, PFMS 18 also includes a housing configured to enclose the illumination device and the imaging device. The housing may be configured to protect the illumination device and the imaging device from damage due to the harsh conditions to which PFMS 18 may be exposed during use. For example, the housing may protect the illumination device and the imaging device from powder deflections from powder stream 30 off build surface 28, may cool the illumination device and the imaging device to remove heat incident on PFMS 18 from melt pool 32 and energy delivery device 16, or the like.

PFMS 18 may be positionally fixed relative to powder delivery device 14 and/or energy delivery device 16, e.g., in the x-y plane shown in FIG. 1. This may help maintain a relative x-y position of PFMS 18 and the image plane of the imaging device relative to powder stream 30. This may facilitate analysis of image data captured by the imaging device.

PFMS 18 may be movable in the z-axis direction of FIG. 1 (e.g., parallel to a longitudinal axis extending from powder delivery device 14 to build surface 28). This may enable movement of image plane 38 along the z-axis of FIG. 1 (e.g., parallel to a longitudinal axis extending from powder delivery device 14 to build surface 28). This may allow PFMS 18 to image powder stream 30 at different positions between powder delivery device 14 and build surface 28. In this way, PFMS 18 may analyze powder stream 30 along powder stream 30 to help determine parameters of powder stream 30 along its length.

In some example, PFMS 18 may be positionally fixed relative to powder delivery device 14 and/or energy delivery device 16 and movable parallel to a longitudinal axis extending from powder delivery device 14 to build surface 28 by an adjustable z-stage 40. Adjustable z-stage 40 may be attached to energy delivery device 16, powder delivery device 14, or a portion of system 10 that moves energy delivery device 16 and/or powder delivery device 14, such that PFMS 18 moves in the x-y axis in registration with energy delivery device 16 and/or powder delivery device 14.

Adjustable z-stage 40 may be controlled by computing device 12 to position PFMS 18 and image plane 38 relative to powder stream 30. Further, computing device 12 may control adjustable z-stage 40 to move PFMS 18 vertically and out of the way to allow powder delivery device 16 and energy delivery device 16 access to physically constrained areas, e.g., between vanes of a doublet or triplet of a nozzle guide vane for a gas turbine engine.

System 10 further includes a topology sensor 48. Topology sensor 48 is configured to monitor an amount of powder captured by melt pool 32 by imaging melt pool 32 and the added material, allowing the mass to be quantified (e.g., by computing device 12) using the dimensions of the added material and density of the material (powder). In some examples, topology sensor 48 includes a laser and a sensor (e.g., an imaging device), which senses laser light reflected by the structure being imaged (e.g., melt pool 32 and the added material). The laser may have a defined wavelength, which may affect the resolution of the topology sensor 48. In some examples, the wavelength and sensor may be selected such that the resolution of topology sensor 48 is a great as about 10 microns (e.g., about 6 microns).

In some examples, topology sensor 48 may be positioned substantially directly above component 22 and may include an interferometer, which provides depth information based on the time from outputting a laser pulse to the sensing of the reflected light. In other examples, topology sensor 48 may be positioned at an offset with respect to component 22 such that the sensor senses depth information without using an interferometer.

In some examples, topology sensor 48 may be integral with system 10, e.g., disposed within the enclosure or working area of system 10. In other examples, topology sensor 48 may be an add-on component to system 10. For example, the enclosure in which the additive manufacturing technique is performed may include a transparent window, and topology sensor 48 may be positioned outside of the enclosure and may image component 22 through the transparent window.

Although a topology sensor 48 is described in the examples of this disclosure, in other examples, another metrology device may be utilized to determine the amount of powder captured by melt pool 32. For example, another type of light source may be used. In some examples, if another type of light source is used, component 22 or stage 20 may include one or more features that serve as indicators of scale. Furthermore, although described as a single topology sensor 48, more than one sensor may be used, and may employ more than one of the technologies described above.

System 10 further includes secondary energy delivery device 17. In some examples, secondary energy device 17 may include an energy source and energy delivery head as described above with respect to primary energy delivery device 16. As such, secondary energy delivery device 17 may be configured to deliver energy 34 to a second spot on build surface 28, as will be further described below. In some examples, secondary energy delivery device 17 may be displaced from a central longitudinal axis of the deposition head, and thus may be called an "off-axis" energy source. Alternatively, secondary energy delivery device may be configured to deliver energy globally to component 22 (e.g., the entire component body 22). Furthermore, although it is considered that the energy source for secondary energy delivery device 17 may be a laser, other sources of energy are considered. For example, the energy source for secondary energy delivery device 17 may include one or more of an induction heater, an infrared heater, a microwave heater, a fan or blower system configured to deliver hot gases to build surface 28, or the like.

System 10 may optionally include microstructure monitoring device (MMD) 19. MMD 19 may be configured to capture data representative of the microstructure of component 22 in-situ, and output the captured data to computing device 12. MMD 19 may include an imaging sensor such as an X-Ray device, a computed tomography (CT) device, a magnetic resonance imaging (MRI) device, or the like. Additionally, or alternatively, MMD 19 may include an acoustic sensing system such as an ultrasound device. Although illustrated as an off-axis add-on to system 10, in some examples MMD 19 may be part of a deposition head and be arranged on-axis.

Computing device 12 may control components of system 10 and may include, for example, a desktop computer, a laptop computer, a workstation, a server, a mainframe, a cloud computing system, or the like. Computing device 12 may control operation of system 10, including, for example, powder delivery device 14, primary energy delivery device 16, secondary energy delivery device 17, PFMS 18, stage 20, powder source 42, powder source mass sensor 44, topology sensor 48, and/or MMD 19. Computing device 12 may be communicatively coupled to powder delivery device 14, energy delivery device 16, PFMS 18, stage 20, powder source 42, powder source mass sensor 44, and/or topology sensor 48 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 12 may include one or more processors. Example of processors include, but are not limited to, one or more microprocessors, digital signal processors (DSPs), application specific integrated circuits (ASICs), field programmable gate arrays (FPGAs), or any other equivalent integrated or discrete logic circuitry, as well as any combinations of such components.

Although FIG. 1 illustrates a single computing device 12 and attributes all control and processing functions to that single computing device 12, in other examples, system 10 may include multiple computing devices 12, e.g., a plurality of computing devices 12. In general, control and processing functions described herein may be divided among one or more computing devices. For instance, system 10 may include a controller for energy delivery devices 16 and 17, powder delivery device 14, and stage 20, a separate controller for PFMS 18, and a separate computing device for analyzing data obtained by PFMS 18, mass sensor 44, topology sensor 48, and MMD 19. As another example, system may include a dedicated controller for each of primary energy delivery device 16, secondary energy delivery device 17, powder delivery device 14, stage 20, PFMS 18, topology sensor 48, and MMD 19, and a separate computing device for coordinating control of powder delivery device 14, energy delivery device 16, PFMS 18, stage 20, powder source 42, powder source mass sensor 44, and/or topology sensor 48 and analyzing data obtained by PFMS 18 powder source mass sensor 44, and/or topology sensor 48. Other examples of computing system architectures for controlling system 10 and analyzing data obtained from system 10 will be apparent and are within the scope of this disclosure.

Computing device 12 may control operation of powder delivery device 14, primary energy delivery device 16, secondary energy delivery device 17, adjustable z-stage 40, stage 20, and/or topology sensor 48 to position component 22 relative to powder delivery device 14, energy delivery device 16, PFMS 18, topology sensor 48, and MMD 19. For example, as described above, computing device 12 may control stage 20 and powder delivery device 14, primary energy delivery device 16, secondary energy delivery device 17, adjustable z-stage 40, topology sensor 48, and/or MMD 19 to translate and/or rotate along at least one axis to position component 22 relative to powder delivery device 14, energy delivery devices 16 and 17, PFMS 18, topology sensor 48, and MMD 19. Positioning component 22 relative to powder delivery device 14, energy delivery devices 16 and 17, PFMS 18, topology sensor 48, and MMD 19 may include positioning a predetermined surface (e.g., a surface to which material is to be added) of component 22 in a predetermined orientation relative to powder delivery device 14, energy delivery device 16, PFMS 18, topology sensor 48, and/or MMD 19.

Computing device 12 may control system 10 to deposit layers 24 and 26 to form component body 25 and eventually finished component 22. As shown in FIG. 1, component 22 may include a first layer 24 and a second layer 26, although many components may be formed of additional layers, such as tens of layers, hundreds of layers, thousands of layers, or the like. Component 22 in FIG. 1 is simplified in geometry and the number of layers compared to many components formed using additive manufacturing techniques. Although techniques are described herein with respect to component 22 including first layer 24 and second layer 26, the technique may be extended to components 22 with more complex geometry and any number of layers. Furthermore, although component 22 is illustrated as being uniform, in some examples component 22 may be functionally-graded and include at least two different portions having different selectively tailored properties, as will be further illustrated and described below.

To form component 22, computing device 12 may control powder delivery device 14, primary energy delivery device 16, and secondary energy delivery device 17 to form, on a surface 28 of first layer 24 of material, a second layer 26 of material using an additive manufacturing technique. Computing device 12 may control primary energy delivery device 16 to deliver energy 34 to a volume at or near surface 28 to form melt pool 32. For example, computing device 12 may control the relative position of energy delivery device 16 and stage 20 to direct energy to the volume. Computing device 12 also may control powder delivery device 14 to deliver powder stream 30 to melt pool 32. For example, computing device 12 may control the relative position of powder delivery device 14 and stage 20 to direct powder stream 30 at or on to melt pool 32.

Computing device 12 then may control a z-axis position of stage 20 and/or powder delivery device 14 and primary energy delivery device 16 such that melt pool 32 will be formed on surface 36 of second layer 26, and may control powder delivery device 14 and energy delivery device 16 to move energy 34 and powder stream 30 along build surface 28 in a pattern until layer 26 is complete. Computing device 12 may control powder delivery device 14 and energy delivery device 16 similarly until all layers are formed to define a completed component 22.

Computing device 12 may control powder delivery device 14 and primary energy delivery device 16 to move energy 34 and powder stream 30 along build surface 28 in a pattern until layer 26 is complete. Computing device 12 may control secondary energy delivery device 17 to deliver energy to a portion of build surface 28 to modify the cooling rate, solidification behavior, or other aspects of the thermal profile of component 22 determined based on data captured by one or more thermal sensors (not illustrated in FIG. 1 for clarity) associated with portions of component 22. The one or more thermal sensors may be configured to capture and store data during the build (e.g., at a first point in time, a second point in time, a third point in time, etc.) taken from a first portion of component 22, a second portion of component 22, and optionally additional portions of component 22.

Computing device 12 may determine, based on the captured data by the one or more thermal sensors, a residual stress of all or a portion the additively-manufactured of component 22. In some examples, to determine the residual stress, computing device 12 may calculate thermal expansion or contraction of component 22 based at least partially on the data captured by the one or more thermal sensors. In some examples, computing device 12 may calculate a cooling rate of the first portion or the second portion of the component 22 by comparing the data captured at the first point in time to the data captured at the second point in time. In some examples, computing device 12 may compare the cooling rate of the first portion to the cooling rate of the second portion to determine the residual stress of the component. In some examples, to determine the residual stress, the computing device is configured receive data indicative of a temperature of a plurality of portions of the component in addition to the first portion and the second portion.

Based partially or completely on the determined residual stress in component 22, computing device 12 may predict final dimensions or update predicted final dimension of component 22. Computing device 12 may then analyze the determined residual stress data to determine whether the predicted final dimensions of component 22 meets a threshold for matching planned or originally modeled dimensions of component 22. For example, the threshold for matching planned final dimensions may mean that build surface 28, and/or one or more dimensions of component 22 remains within 1 millimeter (mm), or 0.5 mm, or 0.1 mm, or 0.01 mm, or the like, of a modeled or planned build surface 28 or other component 22 throughout the build, and component contains residual stresses that will not cause build surface 28 or other component dimensions to warp, distort, or deform such that the component 22 no longer matches the planned dimensions.

Computing device 12 may perform one or more operations based on whether the predicted final dimensions of component 22 meets a threshold for matching planned or originally modeled dimensions of component 22. As one example, upon determining that the predicted dimensions based at least partially of the determined residual stress, computing device 12 may output a warning to an operator, or computing device 12 may stop an additive manufacturing technique being performed by system 10. In this way, system 10 may perform a closed feedback loop to avoid building component 22 that will deform due to residual stresses in component 22 such that that actual dimensions of component 22 do not match the planned dimensions of component 22 that were desired and designed before beginning the additive manufacturing procedure (e.g., the planned dimensions may be pre-determined dimensions, e.g., from a CAD model or the like).

As another example, computing device 12 may modify a build strategy. For instance, computing device 12 may be configured to control at least one of powder delivery device 14, first energy delivery device 16, or second energy delivery device 17 based at least partially on the predicted final dimensions of the component 22 to adjust a build strategy of the component based on the determined residual stress. As used herein, the build strategy is the combination of settings of system 10 that result in the final dimensions of the component 22. To control first energy delivery device 16 and/or second energy delivery device 17, computing device 12 may then modify one or more of the magnitude, power density, travel speed, or spot size (i.e., focus area) to generate a portion of component 22 (e.g., all or a portion of layer 26) to selectively tailor the characteristics of the portion based on the determined residual stress of the portion. For example, computing device 12 may cause second energy delivery device 17 to pause, dwell, or skip certain portions of build surface 28 to modify the determined residual stresses of component 22 or of layer 26. As one example computing device 12 may cause secondary energy delivery device 17 to add energy 34 to portions of component 22 that would cool more quickly (e.g., edges of component 22), and thus generate residual stresses due to thermal contraction, than other portions (e.g., central portions of component 22) of component 22. Managing the heat flux of component 22 prior to, during, and/or subsequent to deposition of layer 26 may stabilize component 22 such that thermal expansion and contraction of different portions of component 22 (e.g., a first portion, a second portion, a third portion, etc.) is stabilized (e.g., occurs at the same or similar rate) relative to other portions of component 22. In this way, residual stresses in component 22 may be limited or eliminated, and system 10 may mitigate or prevent deformation of component due to residual stresses in component 22.

In some examples, in addition to or alternative to modification of energy 34 delivered by first energy delivery device 16 and/or second energy delivery device 17, computing device 12 may modify mass flow to component 22 to counteract or cancel out predicted deformation of layer 26 and/or component 22. For example, computing device 12 may manipulate the mass flow rate of powder in powder stream 30 delivered by powder delivery device 14 to adjust the as-deposited thickness of layer 26. For example, responsive to determining that underlying layer of layers 24 of component 22 contain residual stresses that will cause deformation of component 22 is a particular direction (e.g., bowing), computing device 12 may cause layer 26 and optionally subsequent layers to be deposited such that layer 26 contains residual stresses that will cause component 22 to deform in the opposite direction. In some examples, the opposing residual stresses may cancel out, resulting in final component 22 that has actual dimensions that meet the threshold for matching the planned dimensions of component 22. Additionally, or alternatively, computing device 12 may cause powder delivery device 14 to modify the mass flow rate of powder in powder stream 30 to deposit more or less material on or more portions of component 22 as layer 26 to account for the predicted final dimensions of component 22 to bring the predicted final dimensions of component 22 in line with the planned dimensions.

In some examples, computing device 12 may store/execute one or more machine learning models which may be used to adapt control of powder delivery device 14, primary energy delivery device 16, secondary energy delivery device 17, or another component. For example, data captured by one or more thermal sensors, first energy delivery device 16, second energy delivery device 17, MMD 19, PFMS 18, topology sensor 48, mass source 44, or other component may be used to train the machine learning device.

Figure 2:
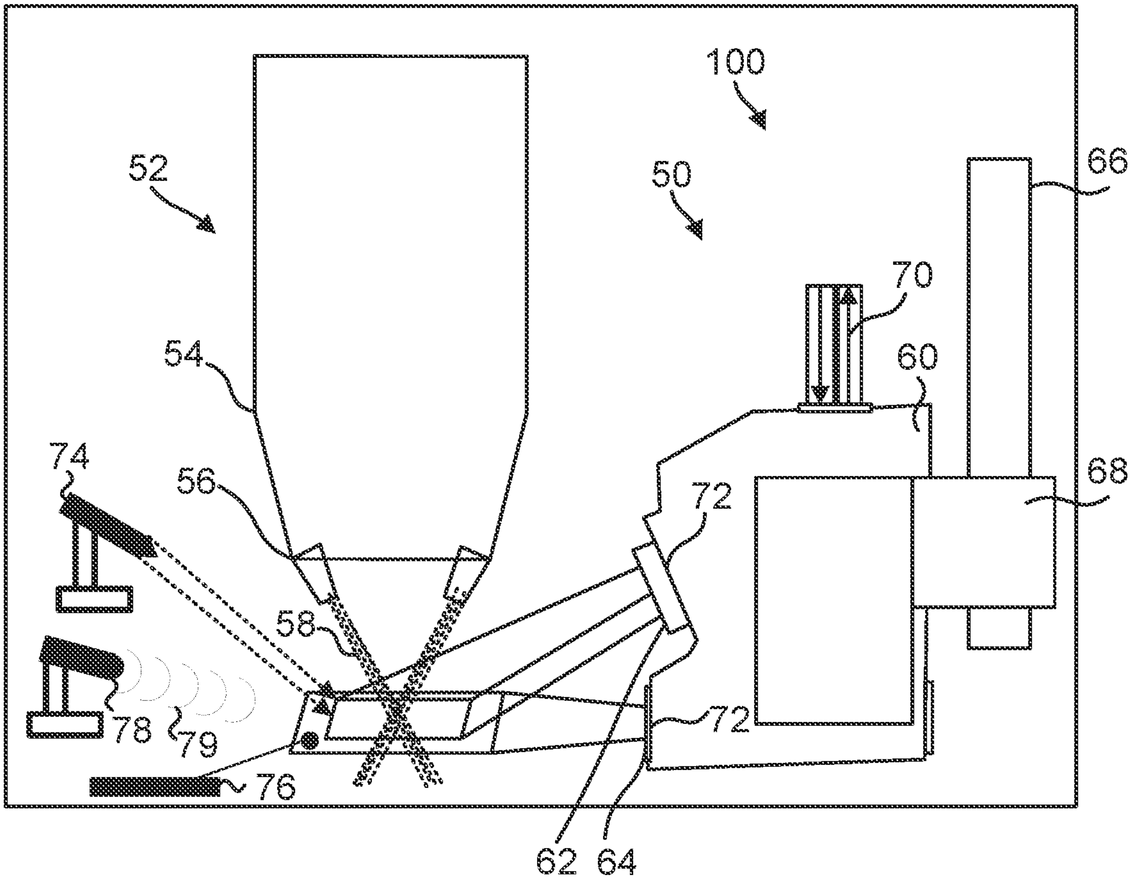
FIG. 2 is a conceptual and schematic diagram illustrating further aspects of the additive manufacturing system of FIG. 1.

FIG. 2 is a conceptual and schematic diagram illustrating example additive manufacturing system 100. Additive manufacturing system 100 of FIG. 2 may be an example of additive manufacturing system 10 of FIG. 1. System 100 includes an example powder flow monitoring system 50 configured to monitor powder flow between a powder delivery device 52 and a build surface (not shown in FIG. 2) during an additive manufacturing technique. Powder delivery device 52 may be an example of powder delivery device 14 of FIG. 1, and PFMS may be an example of PFMS 18 of FIG. 1.

Powder delivery device 52 includes a deposition head 54 that carries a plurality of powder nozzles 56. Plurality of powder nozzles 56 output a powder stream 58 toward the build surface. As shown in FIG. 2, the powder stream 58 may be focused at a focal plane, such that powder stream 58 is converging toward the focal plane and diverging away from the focal plane. As discussed above, deposition head 54 may further include a primary energy delivery device, which is not illustrated in FIG. 2 for improved clarity.

PFMS 18 includes a housing 60 (also referred to as an enclosure), which encloses an imaging device 62 and an illumination device 64. In some examples, imaging device 62 may be a high-speed camera and illumination device 64 may be laser illuminator. Housing 60 is attached to an adjustable z-stage 66 by a bracket 68.

Housing 60 may enclose imaging device 62 and illumination device 64 and help protect imaging device 62 and illumination device 64 from a surrounding environment. For instance, housing 60 may surround imaging device 62 and illumination device 64 and prevent any powder that reflects from the build surface toward PFMS 18 from impacting imaging device 62 or illumination device 64.

Further, housing 60 may be configured to cool imaging device 62 and illumination device 64. Imaging device 62 and illumination device 64 may be exposed to heat from the melt pool at the build surface and energy from the energy delivery device. Imaging device 62 and illumination device 64 may be relatively sensitive to heat and have improved operational lifetime if maintained and operated below a certain temperature. PFMS 50 may include a cooling system 70 that removes heat from within housing 60 to cooling imaging device 62 and illumination device 64. For instance, cooling system 70 may include cooling fluid circuit through which a cooling fluid flows, and housing 60 may include part of the cooling circuit. In some examples, housing 60 may be formed from a material having relatively high thermal conductivity, such as aluminum, to help transfer heat from within housing 60 to cooling system 70 (e.g., a cooling fluid flowing through cooling system 70).

As described above, PFMS 50 may be configured to measure powder flow of powder stream 58 (FIG. 2) at one or more axial (or longitudinal) locations of powder stream 58 and determine one or more parameters associated with the powder flow. For instance, illumination device 64 may illuminate powder of powder stream 58 in a plane oriented substantially orthogonal to a longitudinal axis that extends from powder delivery device 52 to the build surface. PFMS 50 may be positioned at a selected axial or longitudinal location to image a selected axial or longitudinal position between powder delivery device 52 and the build surface. Imaging device 62 may be configured to image at least some of the illuminated powder.

Included in the illustration of system 100 of FIG. 2 are secondary energy delivery device 74, MMD 78, and tertiary energy delivery device 76. Secondary energy delivery device 74 may be a laser configured to deliver energy locally to a portion of the component. Tertiary energy delivery device 76, in the illustrated example, is an induction heater configured to add thermal energy to the entire component. It is also considered that tertiary energy delivery 76 could be another type of heater, or even be a cooling device configured to remove thermal energy from the build surface of the component. In such examples, tertiary energy delivery device 76 may include a heat exchanger. System 100 includes MMD 78. In the illustrated example of FIG. 2, MMD 78 includes an ultrasound probe configured to direct acoustic energy 79 toward the additively manufactured component and receive acoustic energy reflected back from the component for detection and analysis. Each of secondary energy delivery device 74, MMD 78, and tertiary energy delivery device 76 may be communicatively coupled to and under control of a computing device (12, FIG. 1).

Figure 3:
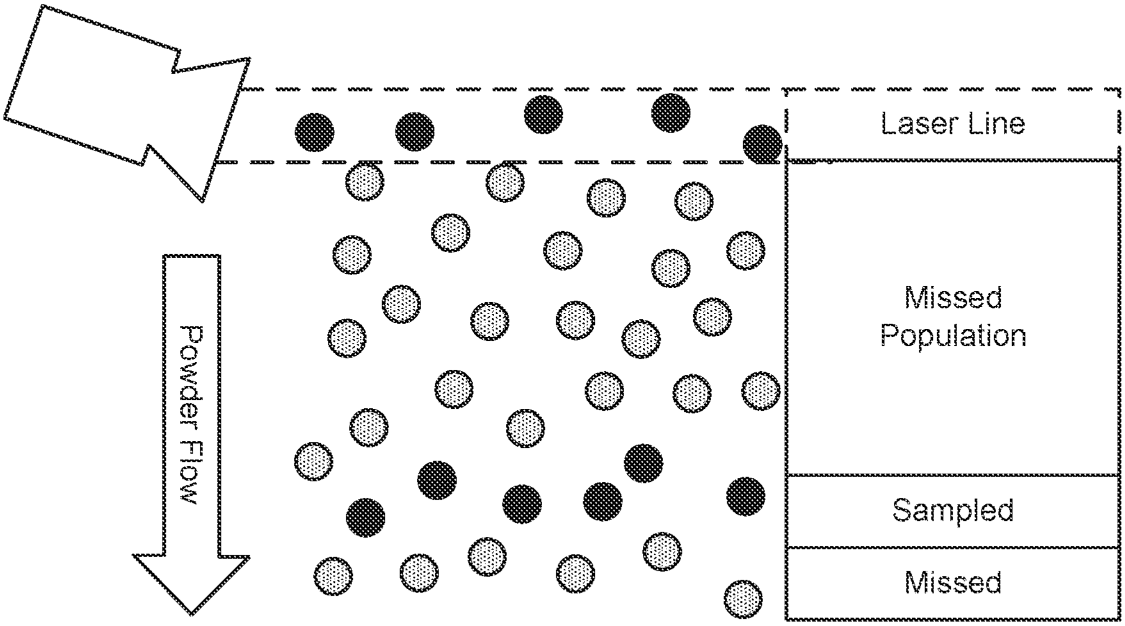
FIG. 3 is a conceptual diagram illustrating an example of portions of a powder stream imaged by a powder flow monitoring system.

FIG. 3 is a conceptual diagram illustrating an example of portions of a powder stream imaged by a powder flow monitoring system. As shown in FIG. 3, since powder is flowing in powder stream 58 at a relatively high velocity, imaging device 62 may not capture images of all the powder in powder stream 58. The fraction of powder that imaging device 62 captures images of may be a function of average powder velocity at the image plane and a frame rate or capture speed of imaging device 62. This is represented in FIG. 3 as "sampled" particles and "missed population" particles. The fraction of particles imaged by imaging device 62 may, in some examples, be less than about 50%, less than about 40%, less than about 30%, less than about 25%, less than about 20%, or less than about 15%.

PFMS 50 may include a computing device (e.g., computing device 12 of FIG. 1) configured to analyze images captured by imaging device 62 to identify a number of particle detections in each captured image and, optionally, derive further parameters from the number of particle detections. As such, computing device 12 may receive image data representing an image captured by imaging device 62. The image data may include representations of illuminated powder of powder stream 58, as imaged by imaging device 62 (e.g., as captured in an image frame by imaging device 62). Computing device 12 may generate a representation of powder stream based on the image data and output the representation of the powder stream for display at a display device.

For instance, computing device 12 may determine a powder mass flow represented by the image data. To do so, computing device 12 may identify a number of powder particles within each image frame. In some examples, computing device 12 additionally may identify a size and/or shape of each powder particle within each image frame. Computing device 12 may implement any suitable image analysis technique to identify powder particles, and, optionally, size and/or shape of powder particles.

Figure 4:
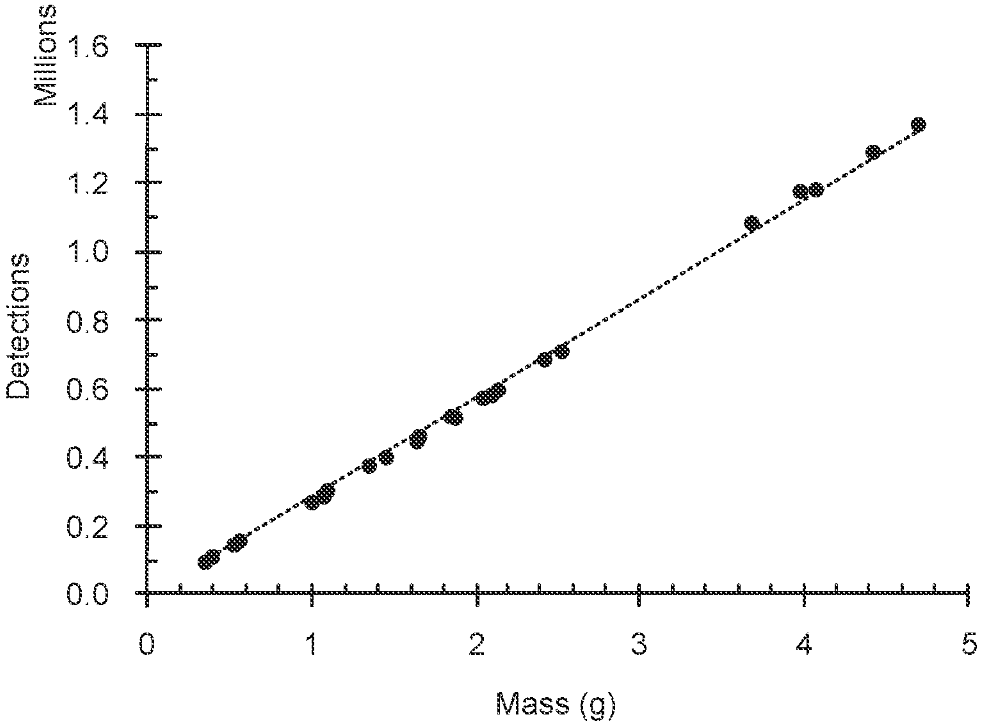
FIG. 4 is an example calibration curve of particle detections versus mass flow.

Once computing device 12 has identified a number of powder particles within an image frame, computing device 12 may determine a mass flow based on the number of powder particles. For example, computing device 12 may determine the mass flow based on a calibration equation or calibration curve. FIG. 5 is an example calibration curve of particle detections versus mass flow. As shown in FIG. 4, the relationship between particle detections may be substantially linear.

The relationship between particle detections and mass flow may be determined experimentally. For instance, the relationship between particle detections and mass flow may be determined for each powder type (e.g., composition, size distribution, or both), as each powder type may have a different relationship between particle detections and mass flow. The relationship may be determined experimentally by flowing a known mass of powder at a known rate, and imaging the powder. By doing this multiple times at multiple rates, the calibration curve may be generated. The curve, in the form of an equation, a look-up table, or the like, may be stored in computing device 12, and computing device 12 may use the calibration curve to determine mass flow of a similar type of powder at a different flow rate based on particle detections.

In some examples, computing device 12 may receive image data representative of a sequence of images of illuminated powder in powder stream 58. Each image may be associated with a time. As such, computing device 12 may select one or more images of the sequence of images and analyze the one or more images. For each selected image, computing device 12 may identify a number of particle detections and, optionally, determine a mass flow associated with powder stream 58 for each image frame.

As described above, system 10 may include both mass flow monitoring and heat flow monitoring. FIG. 1 best illustrates the mass flow monitoring aspects of system 10. FIG. 5 is a conceptual block diagram illustrating further aspects of system 10, best illustrating the heat flow monitoring aspects of the example system. System 10 includes an optical system 80 for observing thermal emissions around melt pool 32 and a melt pool monitor 15 including a thermal camera for monitoring a size and/or temperature of melt pool 32. Identical reference numerals in FIGS. 1 and 5 refer to the same parts. Further, those common parts are the same or substantially identical, aside from any differences described herein.

As shown in FIG. 5, primary energy delivery device 16 includes an optical system 80. Although optical system 80 is shown and described only as associated with primary energy delivery device 16, secondary energy delivery device 17 may include a corresponding optical system. During additive manufacturing, component 22 is built up by adding material to component 22 in sequential layers. The final component is composed of a plurality of layers of material. Primary energy delivery device 16 may direct energy 34 at portion P1 of first layer 24 to form melt pool 32. Powder delivery device 14 may deliver powder stream 30 to melt pool 32, where at least some of the powder at least partially melts and is joined to first layer 24. Melt pool 32 cools as energy 34 is no longer delivered to that location of first layer 24 (e.g., due to energy delivery device 16 scanning energy 34 over the surface of first layer 24). The temperature and cooling rate of melt pool 32 and the surrounding areas of first layer 24 affect the microstructure of the component 22 formed using the additive manufacturing technique.

In some examples, temperature probe 21 may measure a temperature of build surface 28 in portion P2 and output captured temperature information to computing device 12. Although described and illustrated as a temperature probe herein, element 21 may be more generally referred to as thermal sensor 21, and is not necessarily a temperature probe. For example, thermal sensor 21 may be configured to sense heat via an optical system, as described elsewhere herein. Accordingly, system 10 may include one or more thermal sensors (e.g., a single thermal camera of optical system 80, or multiple thermal cameras, or multiple temperature probes, or combinations of thermal cameras and temperature probes, or the like). In any event, system 10 includes one or more thermal sensors configured to capture data indicative of a temperature of first portion P1 of component 22 and second portion P2 of component 22.

In some examples, different portions of component 22 may be defined relative to melt pool 32. In such examples, temperature probe 21 may be movable relative to build surface 28 to maintain a spatial relationship to melt pool 32. In such examples, first portion P1 may be defined as encompassing the portion of build surface 28 that defines melt pool 32 (and/or melt pool 32 plus the area within 1.5 radii of melt pool 32, 2.0 radii of melt pool 32, or 3.0 radii of melt pool 32). In such examples. Second portion P2 may be defined as encompassing an area with a radius equal to melt pool 32 but trailing melt pool 32 along build surface 28 relative to a toolpath by, for example, two, four, or six radii of melt pool 32. Other portions (P3, P4, etc.) may be defined leading melt pool 32, orthogonal to melt pool 32, etc., and each portion may have a corresponding temperature probe 21.

Alternatively, portions (P1, P2, etc.) may be defined relative to the expected final dimensions of component 22. In such examples, probe 21 may be stationary or may be configured to vertically adjust as layers are added to measure a temperature of build surface 28 in same or similar location. Primary energy delivery device 16 may travel through portion P2, forming melt pool 32 as it travels along a toolpath. In such examples, computing device 12 may store instructions for energy 34 applied to each portion (P1, P2, etc.) to reduce or eliminate residual stresses. Computing device 12 may modify energy 34 delivered by primary energy delivery device 16, secondary energy delivery device 17 or a tertiary energy delivery device (or cooling device) to conform to the stored instructions. In some examples, a plurality of portions of component 22 may be divided into a matrix with each portion of the plurality of portions corresponding to a cell in the matrix. In some examples, computing device 12 may similarly store instruction for each portion of the plurality of portions. In some examples, component 22 may be divided into a matrix comprising tens of individual portions, or hundreds of individual portions, or thousands of individual portions.

Computing device 12 may control secondary energy delivery device 17 to modify the temperature and cooling rate of portion P2 of the build surface 28 by adding energy 34 to portion P2 to ensure that component P2 cools according to the desired thermal history profile, such that resulting component 22 has the desired thermal history relative to other portions of the component so that residual stresses are not created as the forces from differential thermal expansion and contraction across the different portions of the component. In some examples portions P1 and P2 may receive the same total amount of energy 34, or may receive different amounts of energy 34 by primary energy source 16, secondary energy source 17, or both. Although portions P1 and P2 are described and illustrated as displaced from each other in the X-Y plane, it should also be considered that layer 24 and 26 may be considered different portions of component 22 in some cases. In such examples, portions P1 and P2 may be displaced from each other in the Z-direction. It should be noted that computing device 12 may control primary energy delivery device and secondary energy delivery device 17 independently based on data from topology sensor 48, MP monitor 15, optical system 80, probe 21, or combinations thereof. For example, computing device 12 may cause secondary energy delivery device 17 to deliver energy 34 to build surface 28 before, during, and/or subsequent to primary energy delivery device 16 delivering energy 34.

In many cases, energy 34 output by primary energy delivery device 16 and/or secondary energy delivery device 17 is very high temperature and the intensity of its thermal emissions is significantly greater than the intensity of thermal emissions from melt pool 32, and the surrounding areas of component 22. Similarly, thermal emissions intensity at and near the center of melt pool 32 may be significantly greater than the intensity of thermal emissions near the edge of melt pool 32 and in areas surrounding melt pool 32. Because of this, it may be difficult to accurately measure temperature and cooling rate of areas near the edge of melt pool 32 and in areas surrounding melt pool 32. This results in difficulty predicting and controlling microstructure of the additively manufactured component 22.

Optical system 80 may include an imaging device and an associated optical train, which senses emissions at or near component 22 during the additive manufacturing technique. For example, optical system 80 may include a visible light imaging device, an infrared imaging device, or an imaging device that is configured (e.g., using a filter) to image a specific wavelength or wavelength range.

The optical train may include one or more reflective, refractive, diffractive optical components configured to direct light to the imaging device. For example, the optical train may be configured to direct light from near component 22 and/or melt pool 32 to the imaging device. In some examples, at least a portion of the optical train is coaxial with the axis at which energy delivery device 16 outputs energy, and the at least a portion of the optical train may be attached to or otherwise configured to move with the portion of energy delivery device 16 that directs or focuses energy 34 at or near the surface of component 22. In this way, optical system 80 may move with energy delivery device 16 and track melt pool 32 as melt pool 32 moves across component 22, without needing to correct for any offsets between energy delivery device 16 and optical system 80 and/or needing to correct for geometry of component 22. In other examples, the optical train may not be coaxial with the axis at which energy delivery device 16 outputs energy 34, and computing device 12 may be configured to compensate for the offset and any affects this may have on the imaging, including shadowing, interference, geometry of component 22, or the like.

Optical system 80 may include an occulting device. The occulting device is configured to reduce or block emissions (e.g., thermal emissions) that originate from the energy output by energy delivery device 16 and/or near a center of melt pool 32, which otherwise obfuscate emissions from solidifying regions of material at or near the edge of melt pool 32 and outside of melt pool 32. The occulting device may be a rigid occulting device or a dynamic occulting device. A rigid occulting device reduces or blocks emissions from a fixed region, e.g., from the energy 34 output by energy delivery device 16. For instance, a rigid occulting device may include a device with fixed dimensions that is opaque to wavelengths of interest. As another example, a rigid occulting device may include an apodizing lens in which a center of the lens if substantially opaque to wavelengths of interest and opacity decreases as a function of radius.

A dynamic occulting device is configured to be controlled to occult different regions, e.g., different sizes and/or shapes. A dynamic occulting device may include a rigid occulting device that is mounted to a device that can translate the rigid occulting device along and/or perpendicularly to the optical axis. As another example, a dynamic occulting device may include an opaque and viscous liquid, such as mercury, contained between two substrates. The substrates are substantially transparent to the wavelength(s) of interest. One or both of the substrates may be movable relative to the other substrate to control the distance between the substrates. By reducing the distance between the substrates, the size of the occulting region may increase. By increasing the distance between the substrates, the size of the occulting region may decrease. As a third example, a dynamic occulting device may include a digital micromirror device. Computing device 12 may control the micromirrors of the digital micromirror device to direct emissions that originate from energy 34 output by energy delivery device 16 and/or near a center of the melt pool away from the imaging device. A digital micromirror device may enable control of both the size and shape of the region of emissions that are occulted.

Figure 6:
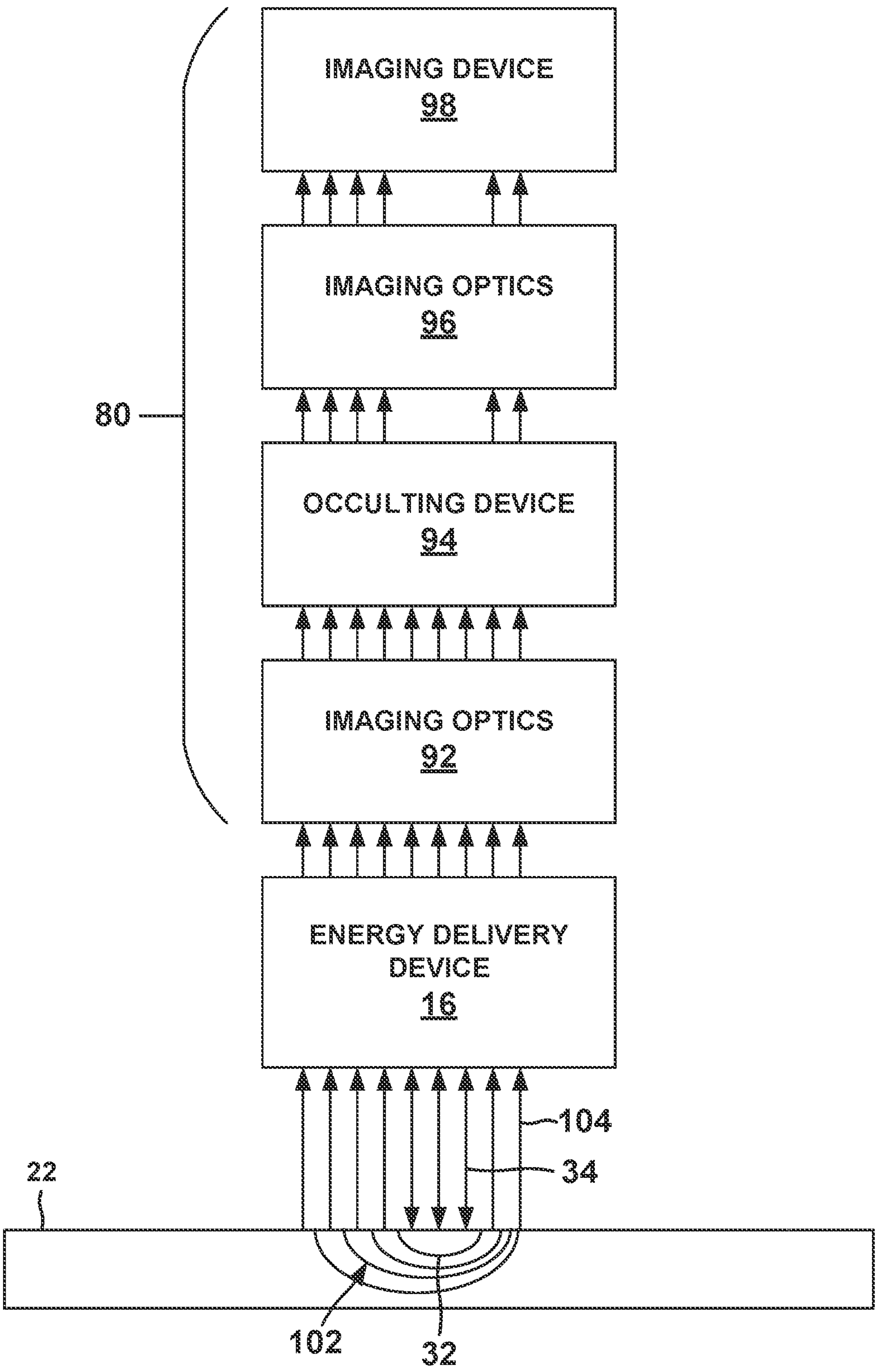
FIG. 6 is a conceptual block diagram illustrating an example optical system for observing thermal emissions around a melt pool formed during the additive manufacturing technique.

FIG. 6 is a conceptual block diagram illustrating an example optical system 80 for observing thermal emissions at and/or around a melt pool 32 and or a focused spot on a build surface 28 where a melt pool is not formed (e.g., by second energy delivery device 17, FIGS. 1 and 5) formed during an additive manufacturing technique. Optical system 80 includes an optical train that includes first imaging optics 92, occulting device 94, second imaging optics 96, and imaging device 98. Imaging device 98 may be any suitable imaging device, including, for example, a visible light imaging device, an infrared imaging device, an imaging device that is configured (e.g., using a filter) to image a specific wavelength or wavelength range, a two color pyrometry imaging device, or the like.

First and second imaging optics 92 and 96 may each include one or more optical devices used to direct light to imaging device 98. For example, First and second imaging optics 92 and 96 may each include one or more refractive optical device (e.g., a lens), one or more reflective optical device (e.g., a mirror), one or more diffractive optical devices (e.g., a grating), one or more dichroic optical devices (e.g., a dichroic filter or mirror), or the like. Although two sets of imaging optics 92 and 98 are shown in FIG. 2, in other examples, system 80 may include a single set of imaging optics or more than two sets of imaging optics.

Occulting device 94 is positioned within the optical train between first imaging optics 92 and second imaging optics 96. In other example, occulting device 94 may be positioned between imaging device 98 and imaging optics 96 or after before imaging optics 92. In some examples, occulting device 94 is positioned as the optical component nearest imaging device. This effectively results in removal of the portion of the image which occulting device 94 blocks. In other examples, occulting device 94 is positioned at another position within the optical train 80 where the image of component 22 resolves. Imaging optics 96 then may be configured to image occulting device 94 onto imaging device 98.

As shown in FIG. 6, in some examples, at least a portion of optical system 80 is coaxial with the axis at which energy delivery device 16 outputs energy 34 (i.e., a central longitudinal axis). For example, at least a portion of second imaging optics 92 (e.g., the portion at which thermal emissions 104 is incident upon second imaging optics 92) may be coaxial with the axis at which energy delivery device 16 outputs energy 34. This may reduce image manipulation that otherwise may be applied to the resulting image to correct for geometry of component 22, angular offset of optical system 80 relative to energy delivery device 16, shadowing due to the angular offset, interference, or the like. In other examples, optical system 80 (e.g., the portion at which thermal emissions 104 are incident upon second imaging optics 92) may not be coaxial with the axis at which energy delivery device 16 outputs energy 34, and computing device 12 (FIG. 1) or another computing device may manipulate the resulting image to compensate for geometry of component 22, angular offset of optical system 80 relative to energy delivery device 16, shadowing due to the angular offset, interference, or the like.

FIG. 6 also illustrates energy delivery device 16 outputting energy 34, which is incident upon component 22 and results in formation of melt pool 32. Surrounding melt pool is a cooling zone 102, in which temperature gradients from the temperature of melt pool 32 to ambient temperature are present. As shown in FIG. 6, melt pool 32 and cooling zone 102 emit thermal emissions 104 (e.g., thermal radiation), which travel through optical system 80 to imaging device 98, which images the thermal emissions 104. Occulting device 94 occults (e.g., reduces the intensity of or substantially eliminates) thermal emissions 104 from a selected region, e.g., a region corresponding to energy 34 and at least a portion of melt pool 32. This may allow imaging device 98 to more effectively image relatively lower intensity thermal emissions from at or near the edge of melt pool 32 and within cooling zone 102. This may enable more accurate measurement of temperatures within the cooling zone 102, and heat flow within cooling zone 102.

Returning to FIG. 5, system 10 also includes melt pool monitor ("MP monitor") 15. Melt pool monitor 15 may include a sensor for monitoring a characteristic of melt pool 32. The monitored characteristic may be indicative of a temperature of melt pool 32. For example, the sensor may include an imaging system, such as a visual or thermal camera, e.g., camera to visible light or infrared (IR) radiation. A visible light camera may monitor the geometry of the melt pool, e.g., a width, diameter, shape, or the like. A thermal (or IR) camera may be used to detect the size, temperature, or both of the melt pool. In some examples, a thermal camera may be used to detect the temperature of the melt pool at multiple positions within the melt pool, such as a leading edge, a center, and a trailing edge of the melt pool. In some examples, the imaging system may include a relatively high-speed camera capable of capturing image data at a rate of tens or hundreds of frames per second or more, which may facilitate real-time detection of the characteristic of the melt pool. In some examples, MP monitor 15 may capture data at a sequence of particular points in time including a first point in time, a second point in time, etc.

Figure 7:
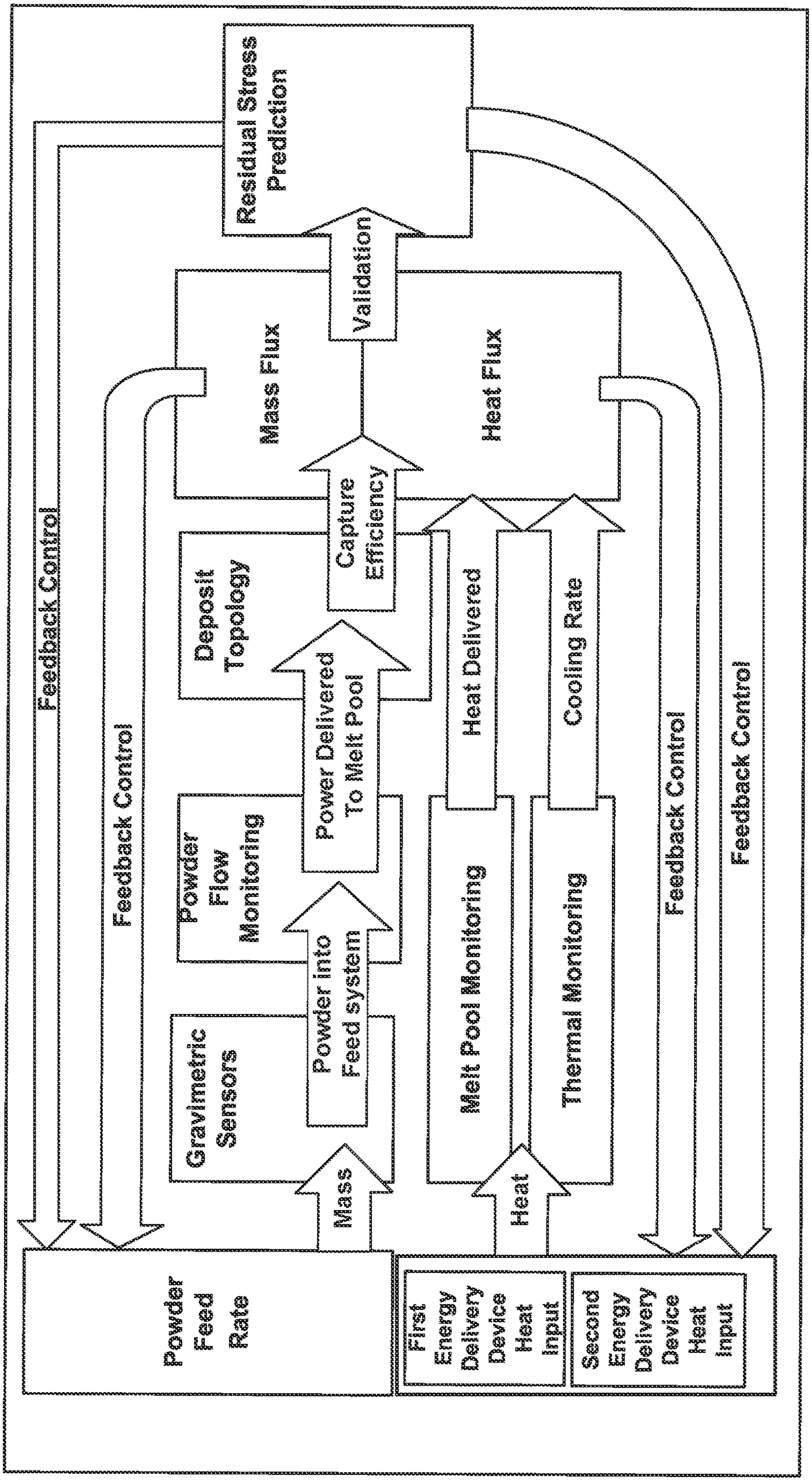
FIG. 7 is a process flow diagram illustrating a mass flux monitoring, heat flux monitoring, and residual stress prediction and control technique.

FIG. 7 is a process flow diagram illustrating an additive manufacturing monitor and control technique. The technique of FIG. 7 may be implemented by system 10 of FIGS. 1 and 5 and will be described with concurrent reference to FIGS. 1 and 5. However, it will be appreciated that system 10 may perform other techniques and the technique of FIG. 7 may be performed by other systems. For example, system 100 of FIG. 2 may perform the described technique.

One or more computing devices 12 may be configured to control a powder feed rate output by powder source 42 (see top left of FIG. 7). For instance, one or more computing devices 12 may be configured to control an agitator of powder source 42, a gas flow rate of gas flowing through powder source 42, a position of one or more valves within flow path 46, or the like to control a powder feed rate output by powder source 42.

One or more computing devices 12 may be configured to receive data from one or more mass flow monitoring sensors, including PFMS 18, powder flow mass sensor 44, and/or topology sensor 48. Data received from powder flow mass sensor 44 indicates a mass flow of powder from powder source 42 to powder delivery device. Data from PFMS 18 indicates a mass flow of powder in powder stream 30 between powder delivery device 14 to adjacent melt pool 32. Data from topology sensor 48 indicates powder mass captured by melt pool 32 and added to component 22.

One or more computing devices 12 may calculate one or more mass flow-related metrics based on the data received from PFMS 18, powder flow mass sensor 44, and/or topology sensor 48. For example, one or more computing devices 12 may determine a capture efficiency by determining a fraction or percentage of powder from powder stream 30 that is captured by melt pool 32 and added to component 22, e.g., by dividing the powder mass captured by melt pool 32, as determined based on data from topology sensor, into the mass flow determined based on data received from PFMS 18.

Further, one or more computing devices 12 may determine an overall mass flux using the data received from PFMS 18, powder flow mass sensor 44, and/or topology sensor 48. One or more computing devices 12 then may use the overall mass flux as an input to the control algorithm used to control the powder feed rate output by powder source 42 (see top left of FIG. 7).

Similarly, one or more computing devices 12 may be configured to control first energy delivery device 16 and second energy delivery device 17 to deliver energy 34 to first layer 24 to establish a given heat input (see bottom left of FIG. 7). For example, one or more computing device 12 may control one or more operating parameters of energy delivery device 16 and/or second energy delivery device 17, such as intensity, pulse rate, pulse width, or the like; one or more positional parameters related to energy delivery device 16, such as dwell time at a location, a movement rate relative to first layer 24, an overlap between adjacent passes of energy 34 across first layer 24, a pause time between adjacent passes of energy 34 across first layer 24, or the like to control heat input to system 10 (e.g., to melt pool 32 and component 22). In some examples, computing device 12 may be configured to operate one of the energy delivery devices (e.g., first energy delivery device 16) at a constant heat input and to control second energy delivery device 17 to modify (e.g., selectively tailor) residual stress of a first portion P1 and/or a second portion P2.

One or more computing devices 12 may be configured to receive data captured by one or more thermal sensors, such as optical system 80 and/or melt pool monitor 82. One or more computing devices may determine a cooling rate and associated heat from using data from optical system 80 and may determine a heat input into component using a size and/or temperature of melt pool 32 as observed by melt pool monitor 15, probe 21, or both. One or more computing devices 12 may be configured to capture data from melt pool monitor 15, probe 21 throughout a period of time (e.g., at a first point in time, a second point in time, a third point in time, etc.). One or more computing devices 12 may be configured to determine a residual stress of portions P1, P2 of component 22 based on the captured data, and thus residual stresses throughout the entirety of component 22. One or more computing devices 12 then may use the determined residual stress as an input to the control algorithm used to control first energy delivery device 16, second energy delivery device 17, or both. (see left of FIG. 7).

In some examples, optical system 80 and/or probe 21 may be configured to sense, capture, and output to one or more computing device 12 data representative of a temperature of portions P1, P2 of component 22. One or more computing devices 12 may be configured to determine residual stresses of portions P1, P2 based on the captured data. One or more computing devices 12 may then use the determined residual stresses to predict final dimensions of component 22. In some examples, the predicted final dimensions may be based on the build strategy to build as-deposited component 22 and on the expected deformation of component 22 due to the determined residual stress.

In some examples, the predicted final dimensions of component 22 may be used as an input to a control algorithm of computing device 12 used to control first energy delivery device 16, second energy delivery device 17, or both. In some examples, for example if the predicted final dimensions of component 12 meet a threshold level of matching planned (e.g., technically specified) component dimensions, one or more computing devices 12 may be configured to continue the build based on the validated predicted final component dimensions. In some examples, if one or more computing devices 12 determines that the predicted final component dimensions do not meet a threshold level of matching planned component dimensions, one or more computing devices may be configured to cause system 10 to stop before building a flawed component 22, or may be configured to output to a display a warning or alarm indicating improper residual stresses contained in component 22. In some examples, one or more computing devices 12 also may use the deposit topology (captured powder mass) and/or capture efficiency metric in the determination of the residual stresses, as the added powder mass and quench effects associated with the captured powder affect the cooling rate of component 22.

Figure 8:
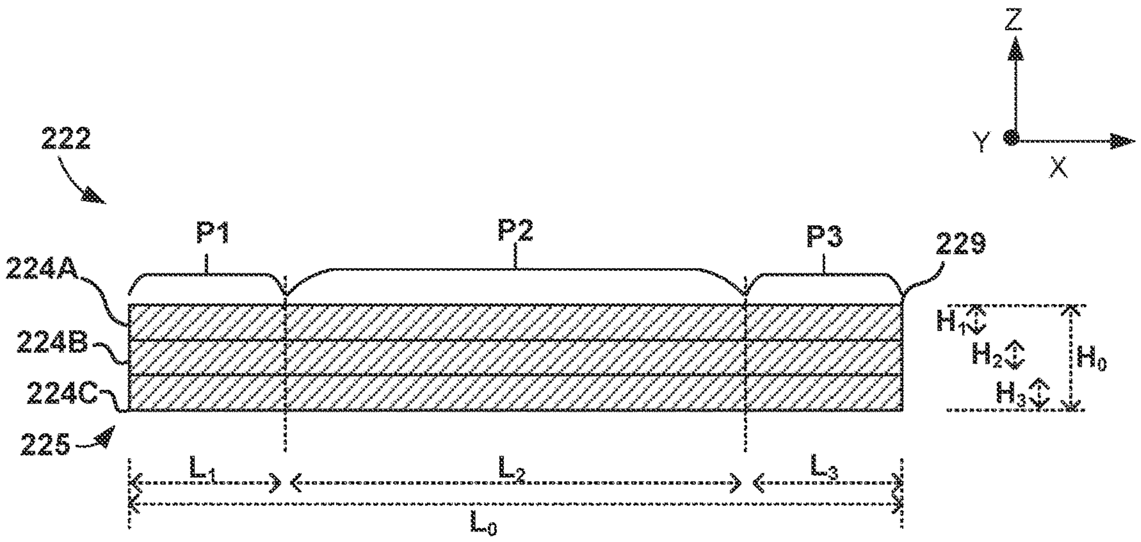
FIG. 8 is a conceptual and schematic diagram illustrating an additively-manufactured component in an initial as-deposited state.
Figure 9:
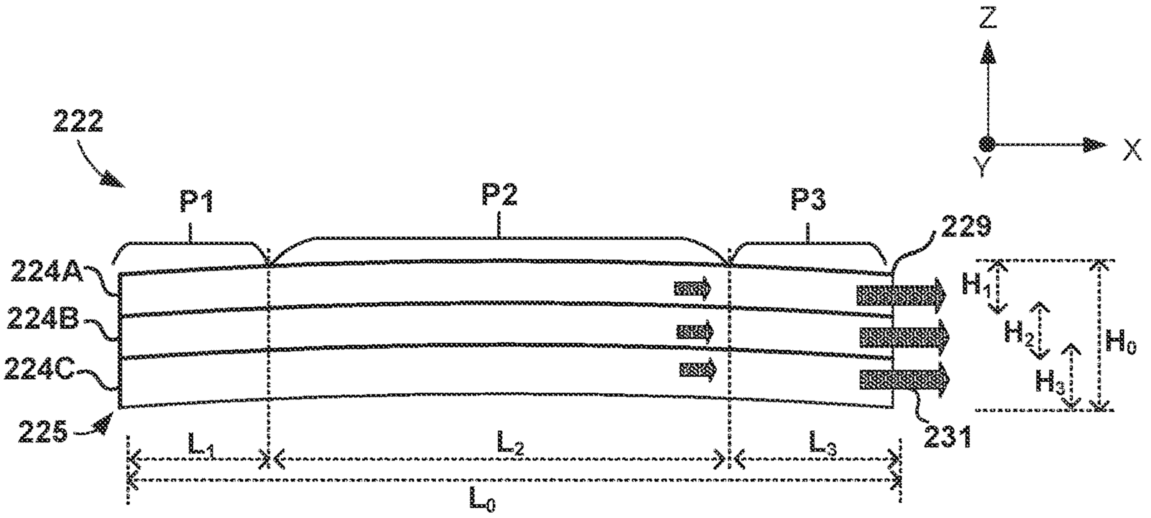
FIG. 9 is a conceptual and schematic diagram illustrating an additively-manufactured component in a final state as distorted by residual stresses in the component.
Figure 10:
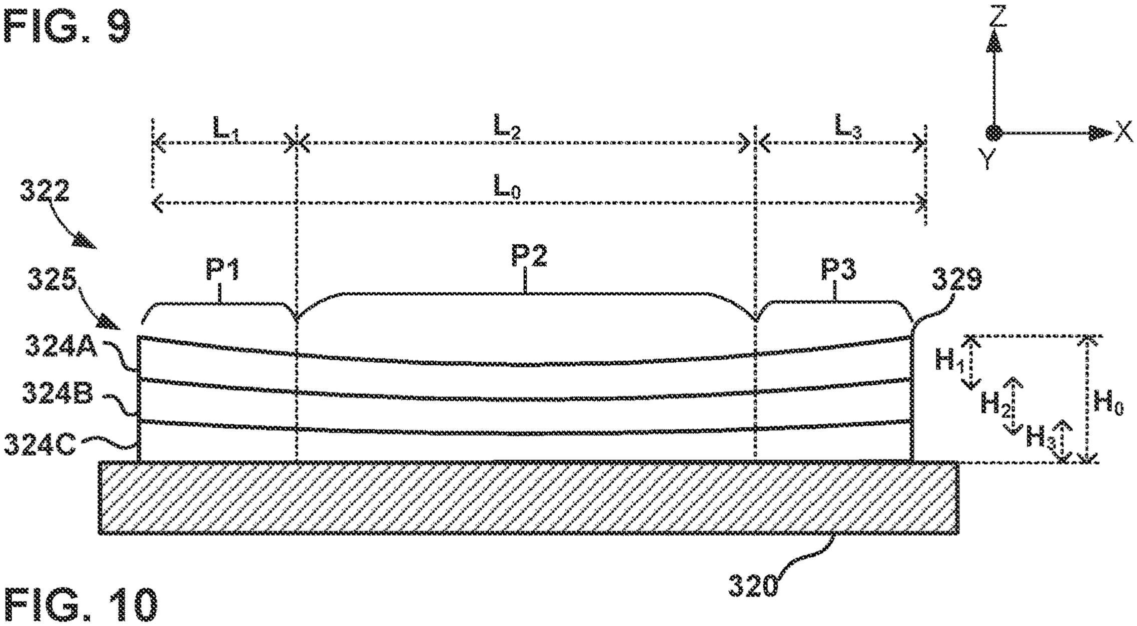
FIG. 10 is a conceptual and schematic diagram illustrating an additively-manufactured component in an initial as-deposited state, accounting for predicted residual stresses in the component.

FIGS. 8-10 are conceptual and schematic diagram illustrating an additively-manufactured component. Similar reference numerals in FIGS. 8-10 indicate similar elements System 10 of FIGS. 1 and 5 or system 100 of FIG. 2 may be used to additively manufacture any of the illustrated components.

FIG. 8 illustrates component 222 in an initial as-deposited state. Component 222 includes a layer-by-layer built component body 225, and thus includes layers 224A, 224B, and 224C. In the illustrated example, the planned final dimensions of component 222 include overall length $L_0$ and overall height $H_0$. Although illustrated as a simple block shape having a length and height in the illustrated example, it is considered that component 222 may define a complex shape in other examples, and thus have complex dimensions mapped in a 3D space model.

The initial build strategy, that is, the settings of the additive manufacturing system of component 222 during manufacturing (e.g., system 10), may not include accounting for residual stresses within component 222 that may cause deformation such that the as-deposited dimensions fail to match the planned final dimensions. As such, in this example, layers 224A, 224B, and 224C are deposited at heights $H_1$, $H_2$, and $H_3$ uniformly to achieve overall height $H_0$, which is the planned overall height of component 222. Component 222 defines portions P1, P2, and P3. Portions P1, P2, and P3 define lengths $L_1$, $L_2$, and $L_3$ respectively to define overall length $L_0$. Portions P1 and P3 are defined as near edges of component 222, only one edge of which is labeled as edge 229 in FIG. 8. Portion P2 is defined in a central portion of component 222 away from edges of component 222.

FIG. 9 is a conceptual and schematic diagram illustrating component 222 in a final state. In some examples, the final state may be achieved after component 222 is removed from a mechanically supporting stage and ready for operational use. As component 222 ages and cools from the as-deposited state of FIG. 8 to the final state of FIG. 9, thermal energy 231 (illustrated by block arrows) may diffuses from component 222 into the surrounding environment. Portions P1 and P3 may, due to the close proximity and increased surface area with the environment, cool more quickly than central portion P2, causing deformation of component 222, illustrated by the bowing in FIG. 9. Thus, FIGS. 8 and 9 illustrate one potential problem with residual stresses in component 222. Although the residual stresses causing deformation are described as stemming from forces of differential thermal contraction of portions P1, P2, and P3 relative to neighboring portions, other causes of residual stress may be identified by computing device 12.

FIG. 10 is a conceptual and schematic diagram illustrating component 322 in an initial as-deposited state, accounting for predicted residual stresses in the component. In the illustrated example, the planned final component dimensions are those in FIG. 8. The as-deposited component of FIG. 10 includes layers 324A, 324B, and 324C, and defines portions P1, P2, and P3. With concurrent reference to FIGS. 1 and 8-10, computing device 12 of system 10 may modify the build strategy of component 322 after determining thermal stresses in component 322 and predicting that the as-deposited dimensions of FIG. 8 will result in the final dimensions of FIG. 9 after exertion of the thermal stresses. Responsive to predicting final component dimensions that do not meet a threshold for matching planned component dimensions, computing device 12 may modify the build strategy to counteract the thermal stresses and adjust the predicted final dimensions to better match the planned final dimensions. In the illustrated example of FIG. 10, computing device 12 modifies settings of a mass flux module, although the build strategy may, in other examples, include modification of a heat flux module, alone or in combination with changes to mass flux.

For example, computing device 12 may cause powder delivery device 14 to modify mass flow of powder in powder stream 30 to apply more mass of powder to portions P1 and P3, which are adjacent to the edges of component 329, to counteract and/or correct for the predicted effects of residual stresses based on data captured by one or more thermal sensors. Although illustrated in FIG. 10 as modifying powder delivery device 14 to adjust the mass flow rate of powder in powder stream 30 for ease of illustration, in some examples, modification of energy 34 delivered by first energy delivery device 16 or second energy delivery device 17 to create component 322 with final actual dimensions that match the planned dimensions.

Figure 11:
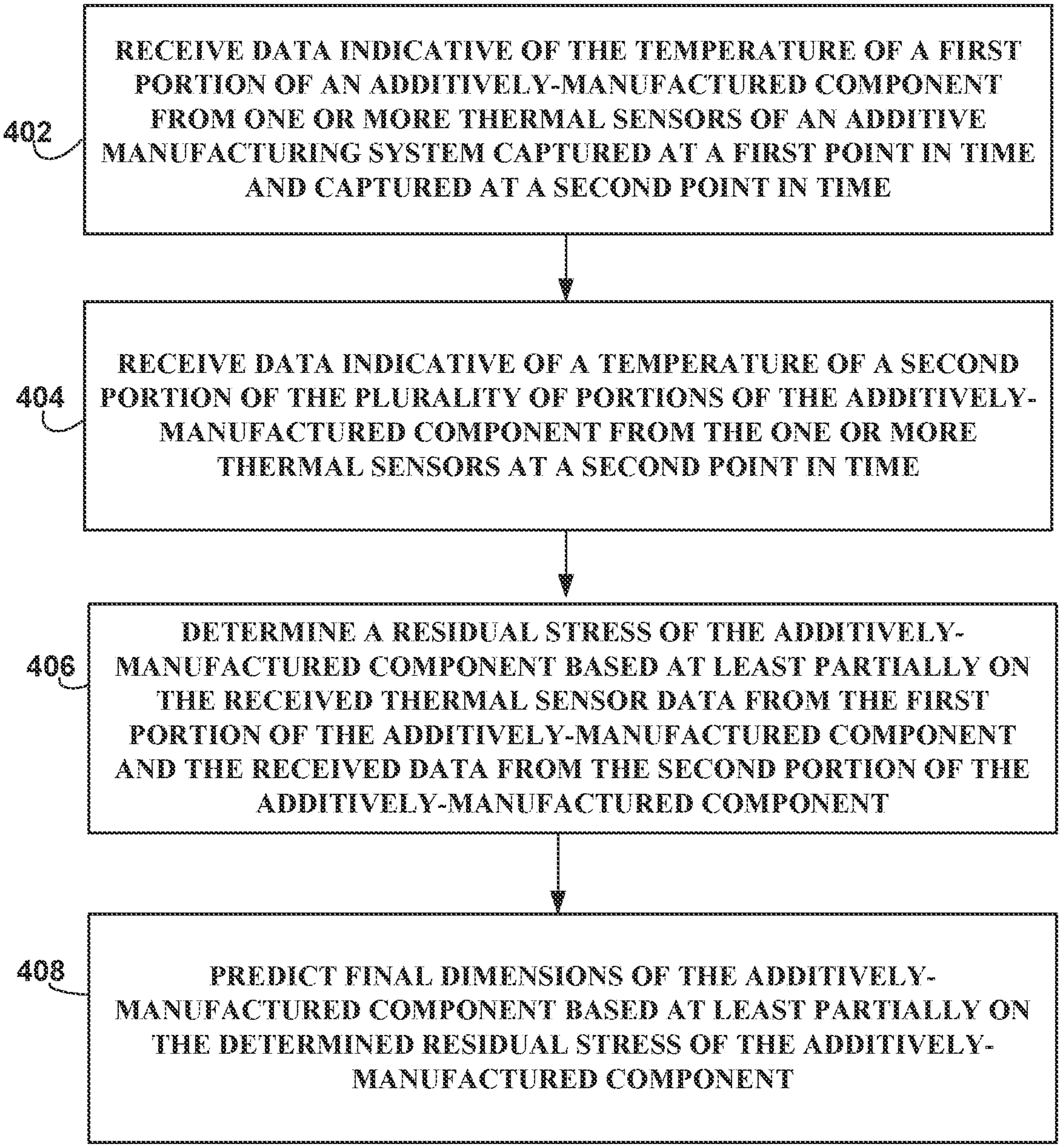
FIG. 11 is a flow diagram illustrating an example technique according to the present disclosure.

FIG. 11 is a flow diagram illustrating an example technique for managing residual stresses in an additively-manufactured component according to the present disclosure. The illustrated technique may be performed by system 10 of FIGS. 1 and 5, and will be described as performed by system 10, but other systems may be used to perform the described techniques, such as system 100 of FIG. 2. Furthermore, system 10 and system 100 may be used to perform other techniques.

Computing device 12 may receive data indicative of the temperature of first portion P1 of component from one or more thermal sensors 21 of system 10 captured at a first point in time and at a second point in time (402). In some examples, system 10 may include first energy delivery device 16 configured to deliver energy 34 to build surface 28 of component 22 to form melt pool 32 in build surface 2. In some examples, system 10 may include second energy delivery device 17 configured to deliver energy to build surface 28 of the component 22. System 10 also includes powder delivery device 14 configured to direct powder stream 30 toward melt pool 32. Computing device 12 may receive data indicative of a temperature of second portion P2 from the one or more thermal sensors 21 at a second point in time (404).

Computing device 12 may determin a residual stress of component 22 based at least partially on the received thermal sensor data from first portion P1 of component 22 and received data from second portion P2 of component 22 (406). In some examples, determining the residual stress may include comprises calculating, by computing device 12, a thermal expansion or contraction of the component 22 based at least partially on the data captured by one or more thermal sensors 21. In some examples, calculating a thermal expansion or contraction may include calculating a cooling rate of first portion P1 or second portion P2 of component 22 by comparing the data captured at the first point in time to the data captured at the second point in time.

Computing device 12 may predict final dimensions of component 22 based at least partially on the determined residual stress of component 22 (408). In some examples, the technique of FIG. 11 may further include controlling, by computing device 12, at least one of the powder delivery device 14, first energy delivery device 16, or second energy delivery device 17 based at least partially on predicted final dimensions of component 22 to adjust a build strategy of the component based on the determined residual stress. In some examples, the build strategy may include all settings of system 10 that result in the final dimensions of component 22. As one example, the build strategy may be adjusted by causing secondary energy device 17 to apply energy 34 to portions of component 22 located at or near an edge of component 22 to equalize the cooling rate of one or more edge portions with the cooling rate of one or more central portions to reduce stresses induced by different rates of thermal contraction of the edge portion or portions with the central portion or portions.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term “processor” or “processing circuitry” may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following examples and claims.

Example 1: An additive manufacturing system includes an energy delivery device configured to deliver energy to a build surface of an additively-manufactured component to form a melt pool in the build surface of the component; a powder delivery device configured to direct a powder stream toward the melt pool; one or more thermal sensors configured to measure a temperature of a first portion of the additively-manufactured component and a second portion of the additively manufactured component; and a computing device configured to: receive data indicative of the temperature of the first portion of the additively-manufactured component from the one or more thermal sensors captured at a first point in time and data indicative of the temperature of the first portion captured at a second point in time; receive data indicative of a temperature of the second portion of the additively-manufactured component from the one or more thermal sensors captured at the first point in time and data indicative of a temperature of the second portion captured at the second point in time; determine a residual stress of the additively-manufactured component based at least partially on the received data indicative of the temperature of the first portion of the additively-manufactured component and the received data indicative of the temperature of the second portion of the additively-manufactured component; and predict final dimensions of the additively-manufactured component based at least partially on the determined residual stress of the additively-manufactured component.

Example 2: The additive manufacturing system of example 1, further comprising a second energy delivery energy delivery device configured to deliver energy to the build surface of the additively-manufactured component.

Example 3: The additive manufacturing system of example 2, wherein the computing device is configured to mitigate deformation of the additively-manufactured component, where deformation is defined as the difference in one or more dimensions of the component between an as-deposited state and a final state, by controlling at least one of the first energy delivery device, the second energy delivery device, or the powder delivery device to reduce or eliminate residual stress in the additively-manufactured component.

Example 4: The additive manufacturing system of any of examples 2 and 3, wherein the computing device is configured to control at least one of the first energy delivery device, the second energy delivery device, or the powder delivery device to impart residual stress in the component to leverage distortion to achieve a final component dimension.

Example 5: The additive manufacturing system of any of examples 2 through 4, wherein: the computing device stores instructions and is configured to execute an initial build strategy, the computing device is further configured to modify the initial build strategy to form a modified build strategy based on the determined residual stress, and the computing device is further configured to control at least one of the powder delivery device, the first energy delivery device, or the second energy delivery device based at least a build strategy, and wherein the computing device is configured to adjust the build strategy of the component based on the determined residual stress.

Example 6: The additive manufacturing system of any of examples 1 through 5, wherein, to determine the residual stress, the computing device is configured to calculate thermal expansion or contraction of the additively manufactured component based at least partially on the data captured by the one or more thermal sensors.

Example 7: The additive manufacturing system of example 6, wherein the computing device is configured to calculate a cooling rate of the first portion or the second portion of the additively-manufactured component by comparing the data captured at the first point in time to the data captured at the second point in time.

Example 8: The additive manufacturing system of example 7, wherein the computing device is configured to compare the cooling rate of the first portion to the cooling rate of the second portion to determine the residual stress of the additively-manufactured component.

Example 9: The additive manufacturing system of any of examples 7 and 8, wherein, to determine the residual stress, the computing device is configured to receive data indicative of a temperature of a plurality of portions of the additively-manufactured component in addition to the first portion and the second portion.

Example 10: The additive manufacturing system of any of examples 1 through 9, further comprising a stage configured to mechanically support the additively-manufactured component, and wherein the computing device is configured to determine the residual stress of the additively-manufactured component without removing the additively-manufactured component from the stage.

Example 11: The additive manufacturing system of any of examples 1 through 10, further comprising a plurality of mass sensors, each mass sensor associated with a portion of the additive manufacturing system.

Example 12: The additive manufacturing system of any of examples 2 through 11, wherein: the first energy delivery device is coincident with a central longitudinal axis of a deposition head, and the second energy delivery device is not coincident with the central longitudinal axis of the deposition head.

Example 13: The additive manufacturing system of any of examples 1 through 12, wherein the computing device is configured to control the energy delivery device based on the determined residual stress by: modifying at least one of a power, a travel speed, a spot size, or a power density of the first energy delivery device or the second energy delivery device, or modifying a mass flow rate of the powder to adjust the as-deposited thickness of a layer being added to the additively-manufactured component.

Example 14: The additive manufacturing system of any of examples 1 through 13, wherein the computing device stores and is configured to execute a machine learning algorithm, and wherein the machine learning algorithm is trained on data generated by the one or more thermal sensors.

Example 15: The additive manufacturing system of any of examples 1 through 14, further comprising a topology sensor configured to capture data indicative of a topology of the build surface, and wherein the computing device is configured to receive data generated by the topology sensor and determine the residual stress based at least partially on the data generated by the topology sensor.

Example 16: A method includes receiving, by a computing device, data indicative of a temperature of a first portion of an additively-manufactured component from one or more thermal sensors of an additive manufacturing system captured at a first point in time and at a second point in time; receiving, by the computing device, data indicative of a temperature of a second portion of the additively-manufactured component from the one or more thermal sensors at a second point in time; determining, by the computing device, a residual stress of the additively-manufactured component based at least partially on the received data indicative of the temperature of the first portion of the additively-manufactured component and the received data indicative of the temperature of the second portion of the additively-manufactured component; and predicting, by the computing device, final dimensions of the additively-manufactured component based at least partially on the determined residual stress of the additively-manufactured component.

Example 17: The method of example 16, further comprising delivering energy to a build surface of the additively manufactured component via a second energy delivery energy delivery device.

Example 18: The method of example 17, further includes delivering, by a powder deliver device, a stream of powder to a melt pool in a build surface of the additively-manufactured component, and controlling, by the computing device, at least one of the powder delivery device, the first energy delivery device, or the second energy delivery device based at least partially on the predicted final dimensions of the additively-manufactured component to adjust a build strategy of the component based on the determined residual stress, wherein the build strategy results in the final dimensions of the additively-manufactured component.

Example 19: The method of any of examples 16 through 18, wherein determining the residual stress comprises calculating, by the computing device, a thermal expansion or contraction of the additively manufactured component based at least partially on the data captured by the one or more thermal sensors.

Example 20: The method of example 19, wherein calculating a thermal expansion or contraction comprises calculating a cooling rate of the first portion or the second portion of the additively-manufactured component by comparing the data captured at the first point in time to the data captured at the second point in time.

What is claimed is:

1. An additive manufacturing system comprising:

an energy delivery device configured to deliver energy to a build surface of an additively-manufactured component to form a melt pool in the build surface of the component;

a powder delivery device configured to direct a powder stream toward the melt pool;

one or more thermal sensors configured to measure a temperature of a first portion of the additively-manufactured component and a second portion of the additively manufactured component; and a computing device configured to:

receive data indicative of the temperature of the first portion of the additively-manufactured component from the one or more thermal sensors captured at a first point in time and data indicative of the temperature of the first portion captured at a second point in time;

receive data indicative of a temperature of the second portion of the additively-manufactured component from the one or more thermal sensors captured at the first point in time and data indicative of a temperature of the second portion captured at the second point in time;

determine a residual stress of the additively-manufactured component based at least partially on the received data indicative of the temperature of the first portion of the additively-manufactured component and the received data indicative of the temperature of the second portion of the additively-manufactured component; predict final dimensions of the additively-manufactured component based at least partially on the determined residual stress of the additively-manufactured component; and control the energy deliver device or the powder deliver device based on the predicted final dimensions of the additively-manufactured component.

2. The additive manufacturing system of claim 1, further comprising a second energy delivery energy delivery device configured to deliver energy to the build surface of the additively-manufactured component.

3. The additive manufacturing system of claim 2, wherein the computing device is configured to mitigate deformation of the additively-manufactured component, where deformation is defined as the difference in one or more dimensions of the component between an as-deposited state and a final state, by controlling at least one of the first energy delivery device, the second energy delivery device, or the powder delivery device to reduce or eliminate residual stress in the additively-manufactured component.

4. The additive manufacturing system of claim 2, wherein the computing device is configured to control at least one of the first energy delivery device, the second energy delivery device, or the powder delivery device to impart residual stress in the component to leverage distortion to achieve a final component dimension.

5. The additive manufacturing system of claim 2, wherein:

the computing device stores instructions and is configured to execute an initial build strategy, the computing device is further configured to modify the initial build strategy to form a modified build strategy based on the determined residual stress, and the computing device is further configured to control at least one of the powder delivery device, the first energy delivery device, or the second energy delivery device based on the modified build strategy.

6. The additive manufacturing system of claim 1, wherein, to determine the residual stress, the computing device is configured to calculate thermal expansion or contraction of the additively manufactured component based at least partially on the data captured by the one or more thermal sensors.

7. The additive manufacturing system of claim 6, wherein the computing device is configured to calculate a cooling rate of the first portion or the second portion of the additively-manufactured component by comparing the data captured at the first point in time to the data captured at the second point in time.

8. The additive manufacturing system of claim 7, wherein the computing device is configured to compare the cooling rate of the first portion to the cooling rate of the second portion to determine the residual stress of the additively-manufactured component.

9. The additive manufacturing system of claim 7, wherein, to determine the residual stress, the computing device is configured to receive data indicative of a temperature of a plurality of portions of the additively-manufactured component in addition to the first portion and the second portion.

10. The additive manufacturing system of claim 1, further comprising a stage configured to mechanically support the additively-manufactured component, and wherein the computing device is configured to determine the residual stress of the additively-manufactured component without removing the additively-manufactured component from the stage.

11. The additive manufacturing system of claim 1, further comprising a plurality of mass sensors, each mass sensor associated with a portion of the additive manufacturing system.

12. The additive manufacturing system of claim 2, wherein:

the first energy delivery device is coincident with a central longitudinal axis of a deposition head, and the second energy delivery device is not coincident with the central longitudinal axis of the deposition head.

13. The additive manufacturing system of claim 1, wherein the computing device is configured to control the energy delivery device based on the determined residual stress by:

modifying at least one of a power, a travel speed, a spot size, or a power density of the first energy delivery device or the second energy delivery device, or modifying a mass flow rate of the powder to adjust the as-deposited thickness of a layer being added to the additively-manufactured component.

14. The additive manufacturing system of claim 1, wherein the computing device stores and is configured to execute a machine learning algorithm, and wherein the machine learning algorithm is trained on data generated by the one or more thermal sensors.

15. The additive manufacturing system of claim 1, further comprising a topology sensor configured to capture data indicative of a topology of the build surface, and wherein the computing device is configured to receive data generated by the topology sensor and determine the residual stress based at least partially on the data generated by the topology sensor.

16. A method comprising:

receiving, by a computing device, data indicative of a temperature of a first portion of an additively-manufactured component from one or more thermal sensors of an additive manufacturing system captured at a first point in time and at a second point in time;

receiving, by the computing device, data indicative of a temperature of a second portion of the additively-manufactured component from the one or more thermal sensors at a second point in time;

determining, by the computing device, a residual stress of the additively-manufactured component based at least partially on the received data indicative of the temperature of the first portion of the additively-manufactured component and the received data indicative of the temperature of the second portion of the additively-manufactured component;

predicting, by the computing device, final dimensions of the additively-manufactured component based at least partially on the determined residual stress of the additively-manufactured component;

delivering, by a powder deliver device, a stream of powder to a melt pool in a build surface of the additively-manufactured component delivering, by an energy delivery device, energy to the build surface of the additively-manufactured component to form the melt pool in the build surface of the component, and controlling, by the computing device, at least one of the powder delivery device or the energy delivery device based at least partially on the predicted final dimensions of the additively-manufactured component to adjust a build strategy of the component based on the determined residual stress.

17. The method of claim 16, further comprising delivering energy to a build surface of the additively manufactured component via a second energy delivery energy delivery device.

18. The method of claim 16, wherein determining the residual stress comprises calculating, by the computing device, a thermal expansion or contraction of the additively manufactured component based at least partially on the data captured by the one or more thermal sensors.

19. The method of claim 18, wherein calculating a thermal expansion or contraction comprises calculating a cooling rate of the first portion or the second portion of the additively-manufactured component by comparing the data captured at the first point in time to the data captured at the second point in time.

* * * * *